(12) United States Patent
Geiger et al.

(10) Patent No.: US 7,343,287 B2
(45) Date of Patent: Mar. 11, 2008

(54) METHOD AND APPARATUS FOR SCALABLE ENCODING AND METHOD AND APPARATUS FOR SCALABLE DECODING

(75) Inventors: Ralf Geiger, Wuembach (DE); Thomas Sporer, Fuerth (DE); Karlheinz Brandenburg, Erlangen (DE); Juergen Herre, Buckenhof (DE); Juergen Koller, Munich (DE); Gerald Schuller, Erfurt (DE)

(73) Assignee: Fraunhofer-Gesellschaft Zur Forderung der Angewandten Forschung E.V., Munich (DE)

( * ) Notice: Subject to any disclaimer, the term of this patent is extended or adjusted under 35 U.S.C. 154(b) by 923 days.

(21) Appl. No.: 10/636,149

(22) Filed: Aug. 7, 2003

(65) Prior Publication Data

US 2004/0184537 A1    Sep. 23, 2004

(30) Foreign Application Priority Data

Aug. 9, 2002   (DE) ............................... 102 36 694

(51) Int. Cl.
*G10L 19/00* (2006.01)

(52) U.S. Cl. ............... 704/230; 704/200.1; 704/225; 704/229; 704/500; 375/240.11; 375/240.03

(58) Field of Classification Search ............ 704/225, 704/500, 229, 230; 375/240.11; 370/469
See application file for complete search history.

(56) References Cited

U.S. PATENT DOCUMENTS 6,108,625 A    8/2000   Kim (Continued)

FOREIGN PATENT DOCUMENTS

DE    197 42 201 C1    2/1999

(Continued)

OTHER PUBLICATIONS

T. Moriya, "A Design of Lossy and Lossless Scalable Audio Coding", Proc. ICASSP, 2000.

(Continued)

*Primary Examiner*—Richemond Dorvil
*Assistant Examiner*—Natalie Lennox
(74) *Attorney, Agent, or Firm*—Michael A. Glenn; Glenn Patent Group

(57) ABSTRACT

An apparatus for scalable encoding a spectrum of a signal including audio and/or video information, with the spectrum comprising binary spectral values, includes a means for generating a first sub-scaling layer and a second sub-scaling layer in addition to a means for forming the encoded signal, with the means for forming being implemented so as to include the first sub-scaling layer and the second sub-scaling layer into the encoded signal that the first and the second sub-scaling layer are separately decodable from each other. In contrast to a full-scaling layer, a sub-scaling layer includes only the bits of a certain order of a part of the binary spectral values in the band, so that, by additionally decoding a sub-scaling layer, a more finely controllable and a more finely scalable precision gain may be achieved.

22 Claims, 9 Drawing Sheets

U.S. PATENT DOCUMENTS 6,349,284 B1 * 2/2002 Park et al. .................. 704/500
6,853,650 B1 * 2/2005 Hutzelmann et al. ....... 370/469

FOREIGN PATENT DOCUMENTS

DE 100 07 171 A1 8/2001
WO WO 98/37700 A1 8/1998

OTHER PUBLICATIONS

Sung-Hee Park, et al., "Multi-Layer Bit-Scliced Bit-Rate Scalable Audio Coding", 103, AES Convention Sep. 26-29, 1997.

Geiger, et al., "Audio Coding Based on Integer Transforms", 111 AES Convention, New York, 2001.

"Coding of Audio Visual Objects, Audio", International Standard 14496-3, 2nd edition, ISO/IEC Moving Pictures Expert Group, ISO/IEC JTCI/SC29/WG11, 2001.

Jin, W; Scordilis, M.S.: A scalable subband audio coding scheme for ATM environments. In: Proceedings of the 2001 IEEE Southeast Conf., SECON2001, Clemenson, S.C., Mar. 3-Apr. 1, 2001, pp. 271-275.

* cited by examiner

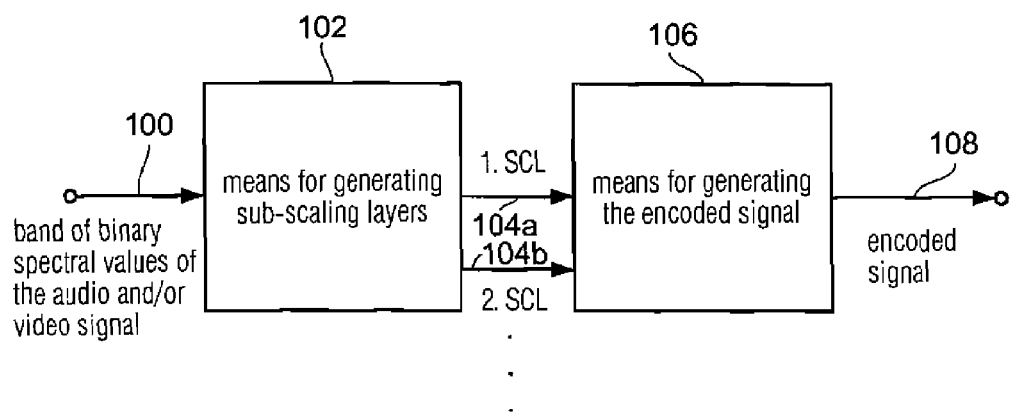
Fig. 1a
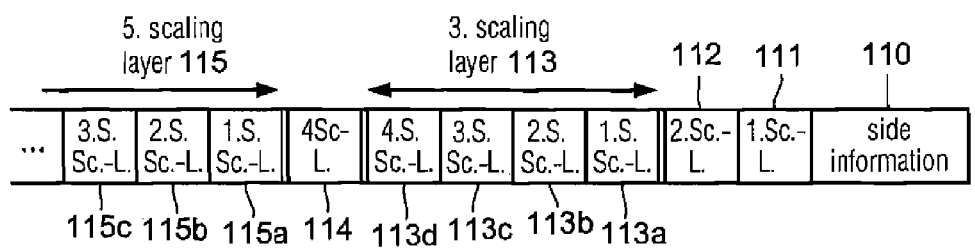
Fig. 1b (scaled / encoded signal)

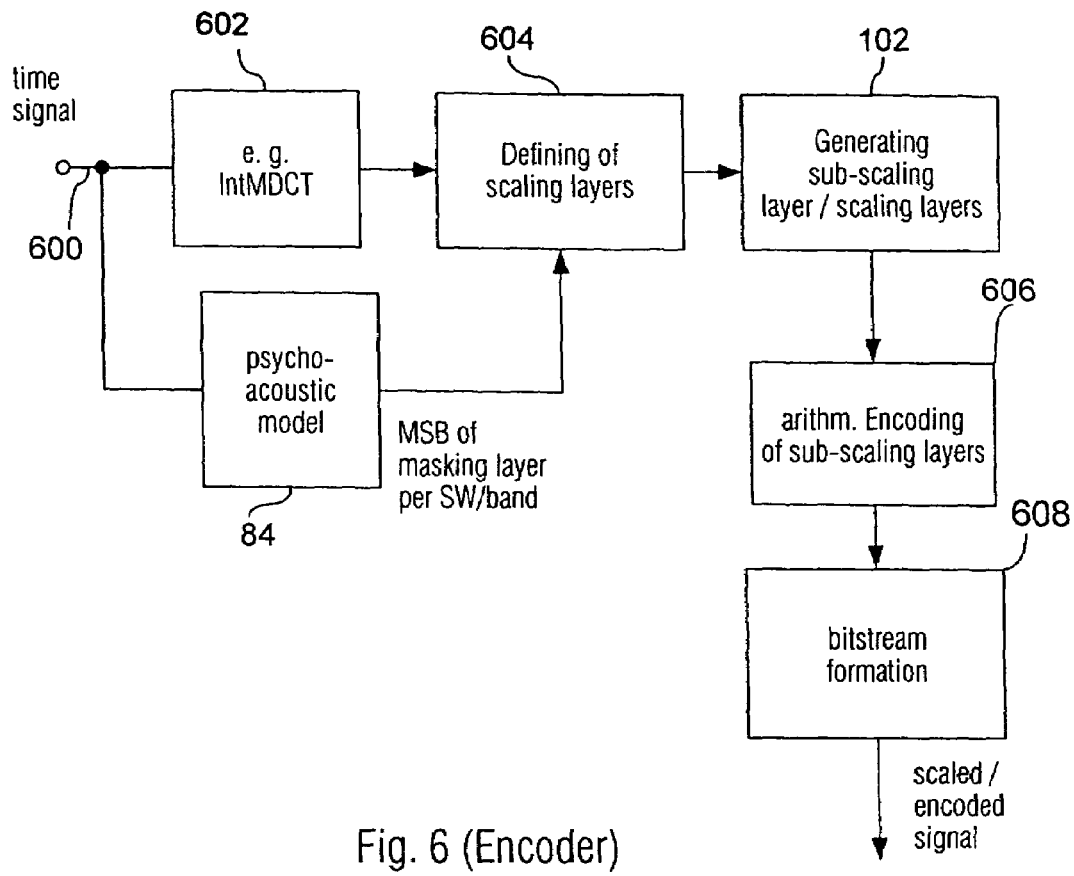
Fig. 6 (Encoder)
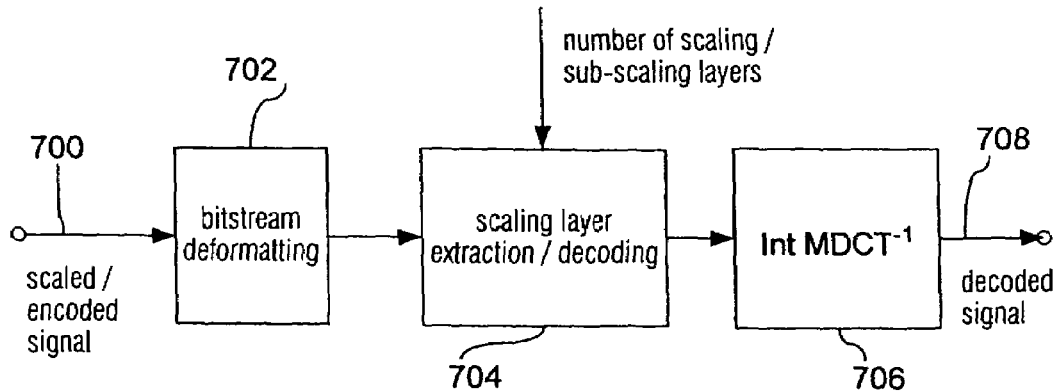
Fig. 7 (Decoder)

METHOD AND APPARATUS FOR SCALABLE ENCODING AND METHOD AND APPARATUS FOR SCALABLE DECODING

FIELD OF THE INVENTION

The present invention relates to audio and/or video encoders/decoders and, in particular, to encoder/decoder means comprising scalability.

BACKGROUND OF THE INVENTION AND PRIOR ART

Up to date audio-encoding methods, such as e.g. MPEG layer 3 (MP3) or MPEG AAC, use transforms, such as for example the so-called modified discrete cosine transform (MDCT), so as to obtain a block-wise frequency representation of an audio signal. Such an audio-encoder usually obtains a current from time-discrete audio sampled values. The current from audio sampled values is windowed so as to obtain a windowed block of for example 1024 or 2048 windowed audio sampled values. For windowing, various window functions are used, such as, for example, a sine window, etc.

The windowed time-discrete audio sampled values will then be implemented in a spectral representation by means of a filter bank. In principle, a Fourier transform or, for special reasons, a variety of said Fourier-transforms, such as for example an FFT or, as has been executed, an MDCT may be used. The block of audio-spectral values at the output of the filter bank may then be subjected to further processing as required. With the above-specified audio-encoders, a quantizing of the audio spectral values follows, with the quantizing stages being typically selected such that the quantizing noise, which is introduced by means of quantizing, ranges below the psycho-acoustic masking threshold, i.e. is "masked away". Quantizing represents a lossy encoding. In order to obtain a further data amount reduction, the quantized spectral value will then be subjected to an entropy-encoding by means of a Huffman-encoding. By adding side information, such as for example scale factors etc., a bit stream, which may be stored or transferred, is formed from the entropy-encoded quantized spectral values by means of a bit stream multiplexer.

In the audio decoder, the bit stream is organized into coded quantized spectral values and side information by means of a bit stream demultiplexer. The entropy-encoded quantized spectral values are first entropy-encoded, so as to obtain the quantized spectral values. The quantized spectral values will then be inversely quantized, so as to obtain decoded spectral values comprising quantizing noise, which, however, ranges below the psycho-acoustic masking threshold and will therefore not be heard. These spectral values will then be implemented in a time representation by means of a synthesis filter bank, so as to obtain time-discrete decoded audio sampled values. In the synthesis filter bank a transform algorithm inverse to the transform algorithm has to be employed. Moreover, after the frequency-time retransform, windowing has to be cancelled.

In order to obtain a good frequency selectivity, up to date audio-encoder typically use block overlapping. Such a case is represented in FIG. 10a. At first, for example 2048 time-discrete audio sampled values are taken and windowed by means of a means 402. The window, which embodies the means 402, has a window length of 2N sampled values and provides a block of 2N windowed sampled values at its output-side. In order to obtain a window overlapping, a second block of 2N windowed sampled values is formed by means of a means 404, which, just for the sake of clarity, is separately represented from the means 402 in FIG. 10a. The 2048 sampled values fed into the means 404, however, are not the time-discrete audio sampled values to be immediately connected to the first window, but include the second half of the sampled values windowed by the means 402 and additionally include only 1024 new sampled values. In FIG. 10a, the overlapping is symbolically represented by a means 406, which causes a degree of overlapping of 50%. Both the two N windowed sampled values output by the means 402 and the 2N windowed sampled values output by the means 404 will then be subjected to the MDCT algorithm by means of a means 408 and/or 410. The means 408 provides N spectral values in accordance with the prior art MDCT algorithm for the first window, while the means 410 also provides N spectral values, however, for the second window, with an overlapping of 50% existing between the first window and the second window.

In the decoder, the N spectral values of the first window, as is shown in FIG. 10b, will be fed to a means 412, which carries out an inverse modified discrete cosine transform. The same applies to the N spectral values of the second window. The same will be fed to a means 414, which also carries out an inverse modified discrete cosine transform. Both the means 412 and the means 414 provide 2 N sampled values each for the first window and/or 2 N sampled values for the second window.

A means 416, which is referred to as TDAC (TDAC=time domain aliasing cancellation) in FIG. 10b, considers the fact that the two windows are overlapping. In particular, a sampled value $y_1$ of the second half of the first window, i.e. with an index N+k, is summed with a sampled value $y_2$ from the first half of the second window, i.e. with an index k, such that, at the output-side, i.e. in the decoder, N decoded time sampled values will result.

It should be appreciated, that by means of the function of means 416, which may also be referred to as an add function, the windowing carried out in the encoder schematically represented by FIG. 10a is automatically considered, such that in the decoder represented by FIG. 10b, no explicit "inverse windowing" has to take place.

If the window function implemented by the means 402 or 404 is designated with w(k), with the index k representing the time index, the condition has to be fulfilled that the squared window weight w(k) added to the squared window weight w(N+k) leads to a square of unity, with k ranging from 0 to N−1. If a sine window is used, the window weightings of which follow the first half wave of the sine function, this condition is always fulfilled, since the square of the sine and the square of the cosine always result in the value 1 for each angle.

A disadvantage of the window method described in FIG. 10a with a subsequent MDCT function is the fact that the windowing is achieved by a multiplication of time-discrete sampled value, and thinking of a sine window, with a floating-point number, since the sine of an angle between 0 and 180 degree, apart from the angle of 90 degree, does not result in an integer. Even if integer time-discrete sampled values are windowed, floating-point numbers will result after windowing.

Therefore, even if no psycho-acoustic encoder is used, i.e. if no lossless encoding is to be achieved, a quantizing is necessary at the output of the means 408 and/or 410 so as to be able to carry out a reasonably clear entropy-encoded process.

If, therefore, known transforms, as have been operated by means of FIG. 10a, should by employed for a lossless audio-encoding, either a very fine quantizing has to be employed in order to be able to neglect the resulting error on the basis of the rounding of the floating-point numbers or the error signal has to be additionally encoded, for example in the time domain.

Concepts of the first kind, that is, concepts in which the quantization is so finely tuned that the resulting error is negligible on the basis of the rounding of the floating-point numbers, are for example disclosed in the German patent application DE 1 97 42 201 C1. Here, an audio signal is transferred into its spectral representation and quantized so as to obtain quantized spectral values. The quantized spectral values are again inversely quantized, transferred into the time domain, and compared to the original audio signal. If the error, meaning the error between the original audio signal and the quantized/inversely quantized audio signal, ranges above an error threshold, the quantizer will be more finely tuned in a feedback-like manner, and the comparison will then be carried out anew. The iteration is finished, when the error falls below the error threshold. The possibly still existing residual signal will be encoded with a time domain encoder and written into a bit stream, which, in addition to the time domain-encoded residual signal, also includes encoded spectral values which have been quantized in accordance with the quantizer settings available at the time of interruption of the iteration. It should be appreciated that the quantizer used does not have to be controlled by a psycho-acoustic model, so that the encoded spectral values are typically quantized more precisely as it should be on the basis of the psycho-acoustic model.

In the technical publication "A Design of Lossy and lossless Scalable Audio Coding", T. Moriya et al, Proc. ICASSP, 2000, a scalable encoder is described, which comprises, as a first lossy data compression module, an MPEG encoder, for example, which has a block-wise digital wave form as an input signal and which generates the compressed bit code. In a local decoder, which is also present, encoding is eliminated, and an encoded/decoded signal will be generated. This signal will be compared to the original input signal by subtracting the encoded/decoded signal from the original input signal. The error signal will than be fed into a second module, where a lossless bit conversion is used. This conversion has two steps. The first step consists in a conversion of a two's complement format into a value sign format. The second step consists converting of a vertical magnitude sequence into a horizontal bit sequence in a processing block. The lossless data conversion is carried out so as to maximize the number of signals or to maximize the number of succeeding zeroes in a sequence so as to achieve an as good a compression of the time error signals as possible, which is available as a result of the digital numbers. This principle is based on a Bit Slice Arithmetic Coding scheme (BSAC scheme), which is represented in the technical publication "Multi-Layer Bit Sliced Bit Rate Scalable Audio Coder", 103. AES convention, pre-print No. 4520, 1997.

The above-mentioned BSAC publication discloses something like an encoder, as is represented in FIG. 8. A time signal will be fed into a block 80, which is designated with "Windows" and time-frequency translation. Typically, use is made of an MDCT (MDCT=modified discrete cosine transform) in block 80. Thereupon, the MDCT spectral value generated by the block 80 will be quantized in a block 82 so as to obtain quantized spectral values in binary form. The quantizing by the block 82 will be controlled by a means 84 calculating a masking threshold using a psycho-acoustic model, with the quantizing in block 82 being carried out such that the quantizing noise remains below the psycho-acoustic masking threshold. In block 85, the quantized spectral values will then be arranged on a bit-wise basis, such that the bits of equal order of the quantized spectral values are arranged in one column. In block 86, scaling layers will then be formed, with one scaling layer corresponding to a column. A scaling layer therefore comprises the bits of equal order of all spectral values quantized. Subsequently, each scaling layer will be successively subjected to arithmetic encoding (block 87), while the scaling layers output by block 87, in their redundantly encoded form, will be fed to a bit-stream formation means, with means 88 providing the scaled/encoded signal on its output side, which, apart from the individual scaling layers, will also include side information, as is known.

Generally speaking, the prior state scalable BSAC encoder will take the highest order bits of all spectral values quantized in accordance with psycho-acoustic aspects, subject them to arithmetic encoding and then write them into the bit stream as a first scaling layer. Typically, since very few very large spectral values will be available, very few quantized spectral values will have a highest order bit equal to "1".

For generating the second scaling layer, the bits of the second highest order of all spectral values will be taken, subjected to arithmetic encoding and then written into the bit stream as a second scaling layer. This procedure will be repeated as many times until the bits of the least order of all quantized spectral values have been arithmetically encoded and written into the bit stream as a last scaling layer.

FIG. 9 shows a scalable decoder for decoding scaled/decoded signals generated by the scalable encoder shown in FIG. 8. First, the scalable decoder includes a bit stream deformatting means 90, a scaling layer extraction means/decoding means 91, an inverse quantizing means 92 as well as a frequency domain/time domain translation means 93 so as to obtain a decoded signal, the quality of which is proportionally dependent on the number of the number of scaling layers selected by the means 91.

In detail, the bit stream deformation means will depack the bit stream and will provide the various scaling layers in addition to the side information. First, the means 91 will arithmetically decode and store the first scaling layer. Then, the second scaling layer will be arithmetically decoded and stored. This procedure will be repeated as many times until either all scaling layers contained in the scaled/encoded signal have been arithmetically decoded and stored, or it will be repeated as many times until the number of scaling layers requested via a control input 94 have been decoded and stored. Thus, the binary patterns for each individual quantized spectral line will be successively generated, with these quantized spectral values, which are represented in binary form, being subjected to the inverse quantization 92 in consideration of a scale factor etc. so as to obtain inversely quantized spectral values which have to be translated into the time domain by the means 93 so as to obtain the decoded signal.

When decoding, a bit for each spectral value is thus obtained with each scaling layer. The bits for each spectral line, which are available after decoding five scaling layers, include the uppermost five bits. It should be appreciated, that in case of very small spectral values, the most significant bits of which only come in fifth place, the MSB (MSB=most significant bit) of this spectral line will not be available after decoding five scaling layers, wherein, for a more precise representation of this spectral line, further scaling layers have to be processed.

The binary representation of spectral values results in that—with the MDCT spectral values being for example amplitude values—each additional bit stands for a precision gain for the spectral line of 6 db.

Thus each additional scaling layer will result in an increase in precision of all spectral values by 6 db.

Considering that at least in noisy signals, the masking threshold of hearing ranges only approximately 6 db below the signal, it will show that a bit-wise scaling is problematic in terms of precision, this bit-wise scaling being provided by the prior art encoder/decoder concept and being used, in particular, for an efficient encoding of the signal portions which are just about to be heard, that is, for example, for the lower bits of the spectral values quantized in accordance with psycho-acoustic aspects.

If, for example, on the basis of a transmission channel bottleneck situation, the lowest scaling layer of the scaled/encoded signal output by block 88 from FIG. 8, is not transmitted, this would result in precision losses of 6 db, which, in an unfavourable constellation, will result in clearly audible interferences in the decoded signal.

SUMMARY OF THE INVENTION

It is the object of the present invention to provide a concept for scalable encoding/decoding, which may be achieved by finer scalability.

The present invention is based on the idea that the psycho-acoustic masking effects in frequency domains occur on a band-wise and not on a line-wise basis, such that, by increasing the precision of a spectral line in one band, an identical precision gain per band is achieved as if a regular fractional increase in precision in the whole band would be carried out, which, however, is not possible in a bit-wise division of the scaling layer. In accordance with the invention, the refinement of the precision scaling will be achieved by subdividing the bit layers into sub-scaling layers. In contrast to the prior art, in which the bits of a certain order of all quantized spectral values are put together to form a scaling layer, the bits of this order will be inventively used in a first sub-scaling layer as a sub-scaling layer in the considered band only by one part of the quantized spectral values. The next sub-scaling layer will then obtain the bits of the same order, now, however, from other quantized spectral values than in the first sub-scaling layer so as to obtain the second sub-scaling layer.

If, for example, a band with m=4 quantized spectral values is considered, then, in the state of the art, a certain scaling layer would include the bits of a certain order of all four spectral lines in the considered band. The next scaling layer would again include all bits of the certain order less 1 of all quantized spectral lines, such that, from scaling layer to scaling layer, a precision gain per spectral line of 6 db will result.

In accordance with the invention, the determined scaling layer will now be subdivided into a maximum of m sub-scaling layers. The first sub-scaling layer would then only include the bit of a certain order of the first spectral line and no bits of the second, third and fourth spectral line. The second sub-scaling layer would then include the bit of a certain order of the second quantized spectral line, however, no bit for the first, third, and fourth spectral line. In a similar manner, the third sub-scaling layer will include the bit of a certain order of the third spectral line, and the fourth sub-scaling layer will include the bit of a certain order of the fourth spectral line of the considered band. As has been set forth, since masking effects will occur on a band-wise and a non-line-basis, each additional sub-scaling layer will provide a precision gain of 6/m db. This means that, in the considered example m=4, each sub-scaling layer will result in a precision gain of 1.5 db.

It should be appreciated that, in a sub-scaling layer, the bits of the certain order of more than one quantized spectral line may be present as well. In the considered example, if a sub-scaling layer would include the bits of a certain order of two quantized spectral lines, the precision gain per sub-scaling layer would no longer be 1.5 db, but 3.5 db. Generally speaking, the second number of quantized spectral values, from which bits are present in the second sub-scaling layer, are selected such that they are greater or equal to 1 and less than the total number of quantized spectral values in the band, with the second number of spectral values further comprising at least the bits of the certain order of a quantized spectral value, which is not present in the first number of quantized binary spectral values, the bits of which are present in the first sub-scaling layer.

In accordance with the invention there exists a selection of various possibilities, as to which of the spectral values is to be selected for the next sub-scaling layer. If the masking threshold of hearing is for example presented in lines (for example, more precise than in 6-db-steps), it is possible to exactly ascertain in the encoder, which of these m spectral lines has so far been the least precise.

In contrast, if the masking threshold of hearing is represented on a band-wise basis (for example, in 6-db-steps), at the beginning of the encoding of a new layer, that is when generating a sub-scaling layer for a new bit layer, each spectral line is to be transmitted with the same precision relative to the masking threshold of hearing. When selecting the line order in the sub-layers, the values of the spectral lines, however, which have so far been transmitted, permit to be considered. For example, if the spectral lines with small spectral value are encoded first in the following sub-layers, a more precise spectral formation of the resulting quantizing errors will result.

In a preferred embodiment of the present invention, sub-scaling layers will be formed using psycho-acoustically quantized spectral values, with the certain order of the bits being processed in the sub-scaling layers being constant above the considered band comprising m spectral lines. In the case of psycho-acoustically quantized binary spectral values, for a psycho-acoustically transparent encoding, all bits of the quantized spectral values have to be transmitted. In this case, especially with the low order bits of the binary quantized spectral values, a finer scalability is advantageous so as to enable a decoding with a slowly decreasing quality depending on the number of considered sub-scaling layers.

In an alternative embodiment of the present invention, the quantized spectral values are not quantized in consideration of psycho-acoustic aspects, but are available within the framework of the computing accuracy of a computer prior to quantizing. Alternatively, the quantized spectral values have been generated using an integer MDCT, which is described in "Audio Coding Based on Integer Transforms", 111 AES Convention, New York, 2001, Geiger, Herre, Koller, Brandenburg.

The IntMDCT is especially favourable, since it comprises the attractive properties of the MDCT, such as, for example, a good spectral representation of the audio signal, a critical sampling and a block overlapping. As has been set forth, the IntMDCT is a lossless transform, that is roundings to integer values during the forward transform may be considered by an inverse rounding operation in the backward transform, so that no rounding errors will occur.

The IntMDCT spectral values are therefore present in lossless form, that is, they were not quantized in consideration of psycho-acoustic aspects.

For a scaling operation with respect to the psycho-acoustic masking threshold, it is preferred to determine at least the most significant bit of the psycho-acoustic masking threshold for each spectral value and/or for each band and to no longer establish the certain order of bits which are to get into a scaling-layer and/or into a sub-scaling layer—in an absolute manner—as was the case in the psycho-acoustically quantized spectral values—but relative to the corresponding most significant bit of the psycho-acoustic masking threshold. The certain order for the bits in a scaling layer is therefore defined relative to the psycho-acoustic masking threshold, for example, in that the bits of the spectral values are to be encoded in a scaling layer, which, for example, comprises an order that is by 1 greater than the MSB of the psycho-acoustic masking layer for the corresponding spectral value and/or—in a band-wise provision of the psycho-acoustic masking threshold—for a band, in which the spectral value is located. The certain order for defining the scaling layers in the case of spectral values, which have not been quantized in consideration of psycho-acoustic laws, is therefore a relative order related to the MSB of the psycho-acoustic masking threshold, which is relevant for the respective spectral value.

In accordance with the present invention, for a psycho-acoustic transparent encoding/decoding, it is preferred to transfer all bits of the quantized spectral values in individual scaling layers or sub-scaling layers comprising the same order as the MSB of the psycho-acoustic masking threshold or the order of which is higher than the order of the MSB of the psycho-acoustic masking threshold.

In particular, when defining the scaling layer, which is to include the bits of the quantized spectral values, which comprise the same order as the most significant bits of the psycho-acoustic masking layer, it is preferred to carry out a classification into sub-scaling layers so as to achieve a better precision scaling so to say at the limit of audibility of interferences. If, for example, the total frequency domain or a part of the frequency domain is subdivided into bands of, for example, four spectral values each and if there is always one spectral value of all resulting bands transmitted in a sub-scaling layer, a precision increase of 1.5 db may achieved with each sub-scaling layer.

It should be appreciated that the precision scaling is freely selectable by setting the size of the bands. If, for example, eight spectral values are grouped into a band and if each sub-scaling layer contains only the bit from a spectral value from this band, a precision scaling of 0.75 db will be achieved.

One advantage of the inventive concept of sub-dividing a scaling layer into several sub-scaling layers, which, however, may be extracted and decoded independently of each other, consists in that it is compatible with all other existing scalability options. As an example, mention should be made of the band width scaling, in which for the acoustically adapted encoding of audio signals at low bit rates, a reduction of the audio band width is mostly carried out so as to be able to represent the remaining spectral values with a sufficient precision. This channel-dependent bandwidth scaling, for example, may also be implemented in the inventive context of using sub-scaling layers. To this end, in the first layers, only a frequency domain with an upper limit will be considered, and, with increasing accuracy in the further layers and/or sub-layers, higher frequency domains, which so far have not been considered, will be encoded on a step-wise basis.

A further advantage of the inventive concept of the sub-scaling layers consists in that it is also compatible with the context-dependent arithmetic encoding, which is also used in MPEG-4 BSAC. MPEG-4 BSAC is described in "Coding of Audio Visual Objects, Audio", International Standard 14496-3, $2^{nd}$ edition, ISO/IEC Moving Pictures Expert Group, ISO/IEC JTCI/SC29/WG11, 2001, The inventive concept is further advantageous in that, on the side of the decoder, any interpretation of the quantized value may be carried out. If not all of the bit layers of the spectrum are transmitted, for each spectral value only the high-order bits will be available in the decoder. Moreover, in view of the masking threshold of hearing transmitted in a preferred embodiment of the present invention and in view of the number of transmitted bit layers, it is possible to determine how many bits of this spectral value have not been transmitted. From this data the decoder has to reconstruct a quantized spectral value. A plausible possibility for this would be to replace the non-transmitted bits by zeroes. Thus, by eliminating the scaling-layers, the quantizing process will always result in a rounding towards smaller absolute values. This type of quantizing, however, will result to the smallest possible mean quantizing errors. The mean quantizing error may be reduced in this kind of quantizing by making use of alternative decoder reconstruction strategies.

BRIEF DESCRIPTION OF THE DRAWINGS

Preferred embodiments of the present invention will be explained below with reference to the attached drawings, in which:

FIG. 1a shows a block diagram of the inventive encoder;

FIG. 1b shows a schematic representation of a scaled encoded signal with scaling layers and sub-scaling layer;

FIG. 6 shows a detailed block diagram of an inventive encoder;

FIG. 7 shows a block diagram of an inventive decoder with IntMDCT;

FIG. 10b shows a block diagram of a prior art decoder for decoding the values generated by FIG. 10a;

DETAILED DESCRIPTION OF THE PREFERRED EMBODIMENTS

Figure 2:
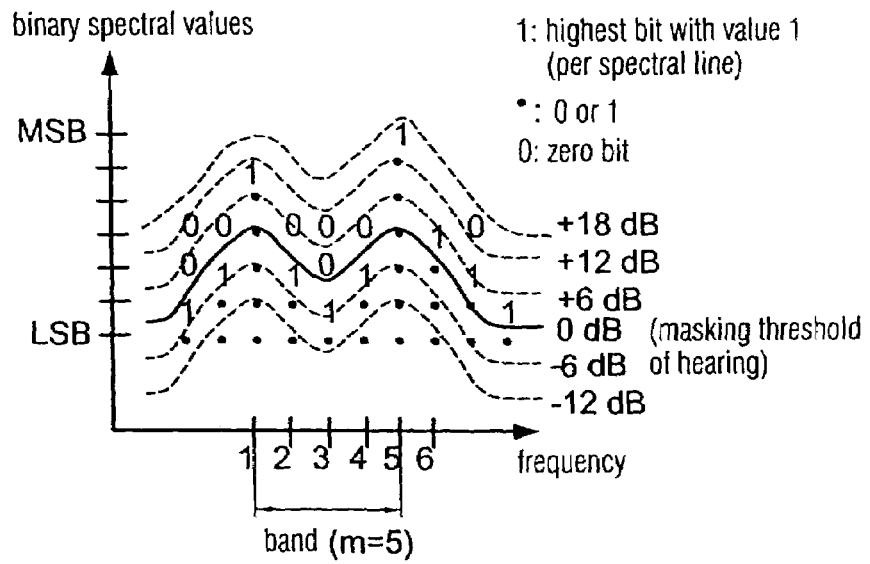
FIG. 2 shows a sub-division of a magnitude spectrum in bit layers in parallel to the masking threshold of hearing.

FIG. 1a shows a schematic block diagram of an apparatus for scalable encoding a spectrum of a signal including audio and/or video information, with the spectrum comprising binary spectral values being grouped into bands. A band of binary spectral values of the audio and/or video signal will be fed into an input 100 of the apparatus for scalable encoding of FIG. 1a. The grouping of binary spectral values in bands may be effected in any given manner. As has been set forth, the present invention is based on the fact that masking effects in the frequency domain occur on a bandwise basis and not spectral value-wise basis. For this reason it is preferred to carry out the grouping of binary spectral values in bands using, for example, the frequency groups (critical bands) or using bands which are smaller than the frequency groups, that is, which include less spectral values than a frequency group, such that a psycho-acoustic or psycho-optical frequency group is grouped into, for example, two or more bands.

A band of binary spectral values of the audio and/or video signal will be fed into an input 102 for generating the sub-scaling layers, with the means 102 for generating the sub-scaling layers generating a first sub-scaling layer, a second sub-scaling layer and, if necessary, further sub-scaling layers. The sub-scaling layers will be output to output lines 104a, 104b . . . from the means 102 and transmitted to a means 106 for scaling the encoded signal, with the means 106 for forming the encoded signal being implemented so as to include the first sub-scaling layer (TSS) and the second sub-scaling layer into the encoded signal at an output 108 at the apparatus shown in FIG. 1a, such that the first and the second sub-scaling layer may be decoded separately from each other.

The means 102 for generating the sub-scaling layers operates using bits of a certain order of a first number of binary spectral values in a band, which the first number being greater or equal to 1 and less than a total number of binary spectral values in the band. For generating the second sub-scaling layer, the means 102 uses bits of a certain order of a second number of binary spectral values, with the second number of binary spectral values being selected such that it is greater or equal to 1 and less than the total number of the binary spectral values in the band, and with the second number of binary spectral values being determined such that they comprise at least one binary spectral value which is not included in the first number of binary spectral values. This means, that each sub-scaling layer, if it has been decoded, will result in that at least one spectral value of the considered band in the decoder is present at a higher precision than if this sub-scaling layer would not have been taken into consideration.

FIG. 1b shows a scaled encoded signal as a schematic bit stream presentation. The bit stream representing the scaled encoded signal first includes side information 110, which may be implemented as specified by the BSAC standard. The bit stream then includes a first scaling layer 111, a second scaling layer 112 and a third scaling layer 113, a fourth scaling layer 114, a fifth scaling layer 115 . . . As an example only, in the scaled/encoded signal shown in FIG. 1b, the third scaling layer 113 is subdivided into four sub-scaling layers (SSL) designated with 113a to 113d.

Moreover, as an example only, the fifth scaling layer is also subdivided into sub-scaling layers, that is in the sub-scaling layers 115a, 115b, 115c . . .

The first scaling layer 111 includes for example the bits of the highest order, either absolute or, as has been set forth, relative to the psycho-acoustic masking threshold—of the spectral values of the spectrum of the audio and/or video signal. As a complete scaling layer, the second scaling layer 112 also includes the bits of the spectral values with an order that is lower by 1.

In total, the third scaling layer includes the bits of an order of the spectral values that is lower by 2, however, not as a complete scaling layer, which may only be completely decoded, but—for a finer precision scaling—is subdivided into four decidable sub-scaling layers 113a, 113b, 113c, 113d, which are separate from each other. In the example represented in FIG. 1b, the total spectrum, that is the total number of spectral values, is subdivided into bands of four spectral values each. The first sub-scaling layer 113a then includes the bit of the order of one spectral value each in one of the bands, the order being is lower by 3. As an analogy to this, the second sub-scaling layer includes the bits of the same order, however, from other spectral values in the individual bands. The third sub-scaling layer 113c includes the bits of the same order, however, again from other spectral values in a band. The same applies for the fourth sub-scaling layer. If bands were selected, which include four spectral values each, each sub-scaling layer has one bit of a spectral value for each band. This means, that each sub-scaling layer in the example represented in FIG. 1b comprises information of a quarter of the number of bits, like a complete scaling layer, such as for example the first scaling layer 111 or the second scaling layer 112.

In the following, a subdivision of the magnitude spectrum in bit layers in parallel to the masking threshold of hearing will be represented in FIG. 2. The spectral values represented by their bit pattern in FIG. 2 are spectral values as are obtained, for example, by the IntMDCT, which will be explained in detail hereinbelow. The binary spectral values represented by means of their bit pattern in FIG. 2 may also be the results of any time domain/frequency domain translation algorithm, such as for example an FFT, and which are represented as binary integers of principally any size. The binary spectral values represented in FIG. 2 have thus not yet been quantized using psycho-acoustic aspects.

Further, in FIG. 2, the psycho-acoustic masking threshold of hearing is plotted as a continuous line designated at 0 db.

From the course of the masking threshold of hearing in the spectrum, bit layers—running in parallel to the masking threshold of hearing—will result, with the membership of a bit to a bit layer reflecting the psycho-acoustic/or psycho-optical relevance of this bit. For example, from FIG. 2 it may be seen that the spectral value designated at 1 comprises bits, which occupy two bit layers above the masking threshold of hearing. In contrast, the even greater spectral value 5 is characterized in that it comprises higher order bits occupying three bit layers above the masking threshold of hearing. The spectral values 2, 3, and 4, in contrast, only include bits lying in a bit layer below the masking threshold of hearing.

With respect to the psycho-acoustic transparency, that is the audibility of interferences on the basis of a quantizations and/or on the basis of "leaving out" low-order bits, the masking threshold of hearing will be referred to as the 0-db-line. The psycho-acoustically most significant bit layer, and thus the first scaling layer in the example shown in FIG. 2, is the bit layer between 12 db and 18 db. Here, only the spectral value with the number 5 provides a contribution. The first scaling layer 111 from FIG. 1b would therefore include only information on the spectral value 5 in the example shown in FIG. 2.

The second bit layer between 6 db and 12 db, that is the second scaling layer 112 from FIG. 1b, only includes information on bits of the first spectral value and of the fifth spectral value, however, no information on the other spectral values, as their MSBs range in lower bit layers.

In the example shown in FIG. 2, the third scaling layer 113 from FIG. 1b includes the bits between the 0-db-line and the +6-db-line in FIG. 2 and now includes only information on the sixth, the fifth, and first spectral line, however, still no information on the other spectral values. If now the third scaling layer in the example of FIG. 2 would be processed as a complete scaling layer, the precision graduation from the second scaling layer to the third scaling layer would be very intense in that a decoding of only the first and second scaling layer—without the third scaling layer—would lead to strong audible interferences. In contrast, considering the third scaling layer would hardly result in any audible interferences. In accordance with the invention graduation in this bound is achieved in that the sub-scaling layers of the third scaling layer are formed, where, in the situation shown in FIG. 2, despite a band division for example in m=5, only two sub-scaling layers would suffice, while a first sub-scaling layer would include the second order bit of spectral value No. 1, while a second sub-scaling layer would include the third order bit of spectral value No. 5, with these bits in the sub-scaling layers for spectral value No. 1 and spectral value No. 5 having the same order relative to the least significant bits of the masking threshold.

Figure 3:
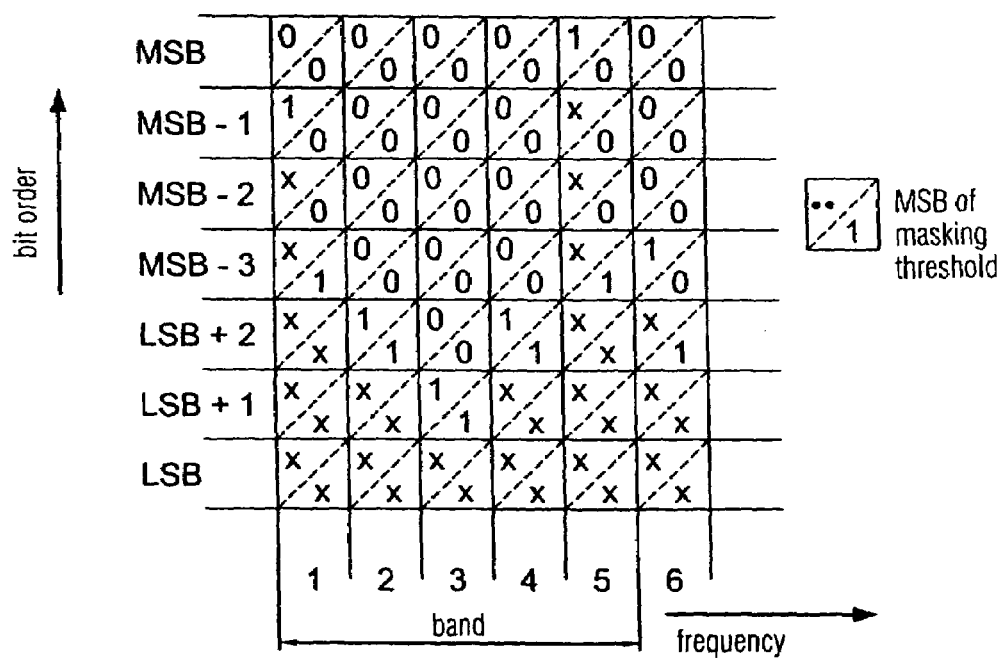
FIG. 3 shows a schematic representation of the sub-division of FIG. 2 in consideration of the MSB of the masking threshold.

For elucidating these facts, reference will be made to FIG. 3 below. FIG. 3 shows a detailed representation of the situation in FIG. 2, with the masking threshold of hearing no longer being plotted by means of its actual value, as is illustrated in FIG. 2, but in FIG. 3 is represented with respect to its most significant bits.

In accordance with the invention, it has been found out that for a psycho-acoustic transparency, in order to avert any unfavourable instances, so many bits of a quantized spectral value have to be transmitted such that the order of the lastly transmitted bit corresponds to the order of the most significant bit of the masking threshold associated with this spectral value. Expressed in other words, this means that all bits from a spectral value—provided the same exist—, which comprise a higher order than the MSB of the masking threshold associated with this spectral value have to be transmitted, and that further also the bit of the spectral value comprising the same order as the MSB of the masking threshold, is to be transmitted.

The inventive precision scaling with especially interesting with respect to the psycho-acoustic masking threshold, that is, for the bits of spectral value having the same order as the MSB of the masking threshold, which is associated to the spectral value. In the diagram shown in FIG. 3 these bits are plotted as bold-edged boxes.

Generally speaking, the bit order is plotted in a vertical direction in FIG. 3, meaning from MSB over MSB −1, MSB −2, MSB −3, LSB +2, LSB +1 to LSB. However, the expression "MSB" in FIG. 3 does not designate the MSB of a certain spectral value or of a psycho-acoustic masking threshold, but the absolute MSB, that is the maximum representable power of two in the binary system.

In contrast, in the bold-edged boxes represented in FIG. 3, the MSB of the masking threshold of hearing is represented for a spectral value of 1 to 6. In particular, each box is subdivided by a dotted diagonal, with a bit of a spectral value being above the diagonal, while below the diagonal there is a bit of the masking threshold for this spectral value. Bits designated at "1" have the value of 1. Bits designated at "zero" have the value of "0". Finally, bits designated with "x" have the value "0" or "1". The first scaling layer and/or first bit layer in the example shown in FIG. 3 thus includes the bit MSB of the spectral value 5, the bit "MSB −1" of the spectral value 4, the bit "MSB −2" of the spectral value 3, the bit "MSB −1" of the spectral value 2 and the bit MSB of the spectral value 1. The certain order of the bits in the first scaling layer is therefore by 3 greater than the order of the bit in which the MSB of the masking threshold is located.

The second scaling layer would then include the bits (MSB −1), (MSB −2) (MSB −3), (MSB −2) and (MSB −1) for the spectral values of 5, 4, 3, 2, and 1. The third scaling layer would then include the bits (MSB −2), (MSB −3), (LSB +2), (MSB −3), and (MSB −2) again for the spectral values 5, 4, 3, 2, and 1. The fourth scaling layer, which is preferred to be divided into sub-scaling layers, would then include the bold-edged bits from FIG. 3, that is (MSB −3), (LSB +2), (LSB +1), (LSB +2), and (MSB −3) again for the spectral values 5, 4, 3, 2, and 1. A transmission of the first, second, third, and fourth scaling layer results in a psycho-acoustic transparency, while, if the fourth scaling layer would be left out, a precision loss of 6 db will be obtained.

In accordance with the invention, the fourth scaling layer is sub-divided, for example, into five sub-scaling layers, where in each sub-scaling layer, a spectral value bit for a spectral value will be provided in the band comprising five spectral values.

Each sub-scaling layer thus provides a precision increase of 6 db/(m=5)=1.5 db.

In order to be able to trace the course of the bit layers in a decoder in the embodiment represented in FIG. 3, the masking threshold of hearing and/or the course of the only just psycho-acoustically significant bit, that is the MSBs of the masking threshold of hearing, is transmitted within the side information 110 from FIG. 1b to the decoder.

For this purpose, two alternatives are preferred. These include the lines-wise representation and the band-wise representation.

Owing to its continuous course, the masking threshold of hearing maybe efficiently represented in a line-wise representation by the frequency response of an FIR filter with few coefficients or by a polynomial interpolation. Here, for each frequency response an individual value of the masking threshold of hearing is generated.

In band-wise representation, reference is made to the fact that the psycho-acoustic masking effects, which are based on the masking threshold of hearing, may be expressed on a band-wise basis, with the band division may be in accordance with the Bark-scale and preferably represents a refinement of the Bark-scale. This band-wise representation is also used in prior art methods for an acoustically adapted audio encoding, such as, for example, MPEG-2 AAC. For representing the masking threshold of hearing it is thus sufficient to transmit one value per band.

As has already been set forth, FIG. 2 and FIG. 3 represent the definition of bit layers of an identical psycho-acoustic significance, for example, in the IntMDCT spectrum. As has been set forth, the bits are encoded on a layer-by-layer basis, starting from the highest layer, and transmitted. Upon reaching the bit layer corresponding to the masking threshold of hearing (the bold-edged bits in FIG. 3), the transmitted signal is psycho-acoustically transparent. The transmission of further bit layers, that is from bits below the bold-edged boxes represented in FIG. 3, increases the precision and thus the safety distance to the masking threshold of hearing. Finally, if all available bits are transmitted, the method operates on lossless basis. As has been set forth, an arithmetic encoding is preferably used for redundancy reduction of the transmitted bits.

The refinement of the precision scaling of the basis of the inventively used sub-scaling layers, which may be processed separately from each other in the decoder, is especially advantageous in the area above the masking threshold of hearing, on the masking threshold of hearing and below the masking threshold of hearing (related to the order of the MSB of the masking threshold of hearing). Without any precision scaling, an increase in precision by 6 db will result in a layer-wise transmission of the bits of the IntMDCT spectrum. If, however, one considers, that at least in noisy signals, the masking threshold of hearing ranges only approximately 6 db below a signal, it is obvious that a scaling of the precision in 6-db-steps is often too coarse for an efficient encoding of the only just audible signal portions.

The subdivision in 1.5-db-steps described above, if bands with four spectral values are used and if one single spectral value is arranged in each sub-scaling layer, or if, for example, bands with eight spectral values are used and two spectral values are considered in each sub-scaling layer, a correspondence as regards the adaptation of precision should be in 1.5-db-steps, which is also present in MPEG-2 AAC. Here, a band-wise adaptive quantization of continuous spectral values is effected by means of scaling factors of the form $2^{0.25 \times n}$, with n assuming integer values. If n is increased by 1, the precision of the quantization will change at MPEG-2 AAC by 1.5 db.

The inventive concept provides this refinement of the precision scaling by subdividing the bit layers in sub-scaling layers, with m sub-layers of one layer being obtained by sub-dividing m adjacent lines each on m sub-layers. With each newly transmitted sub-layer the precision will increase by 6/m db. The m=4 a graduation in 1.5-db-steps is also possible. In contrast to the above-described quantization in the MPEG-2 AAC method, the precision in each sub-layer is increased only for one of m spectral lines in the inventive concept. Since the psycho-acoustic masking effects occur in the frequency domain on a band-wise and not on a line-wise basis, the same precision gain per band is obtained by increasing the precision of a spectral line as when regularly increasing precision in the whole band.

Figure 4:
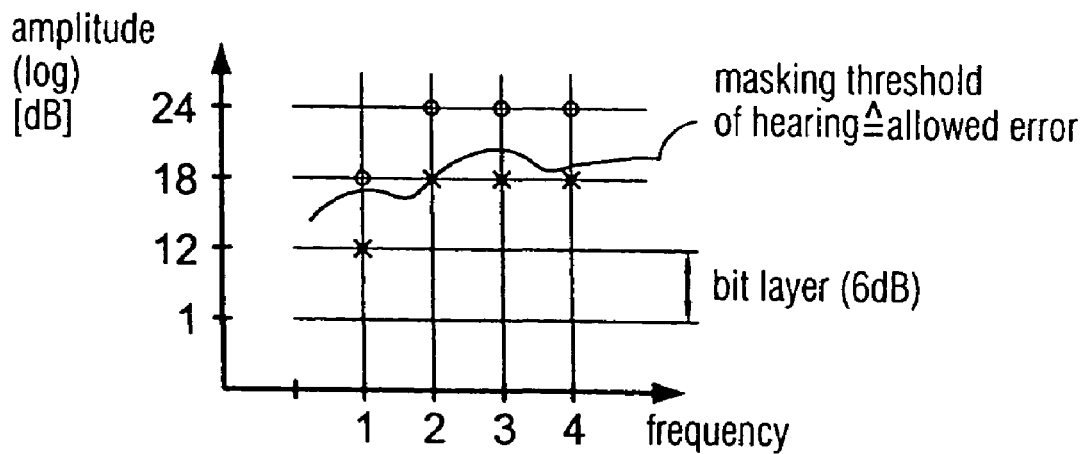
FIG. 4 shows a schematic representation for illustrating the selection of a spectral value for the next sub-scaling layer in a continuously given masking threshold of hearing.
Figure 5:
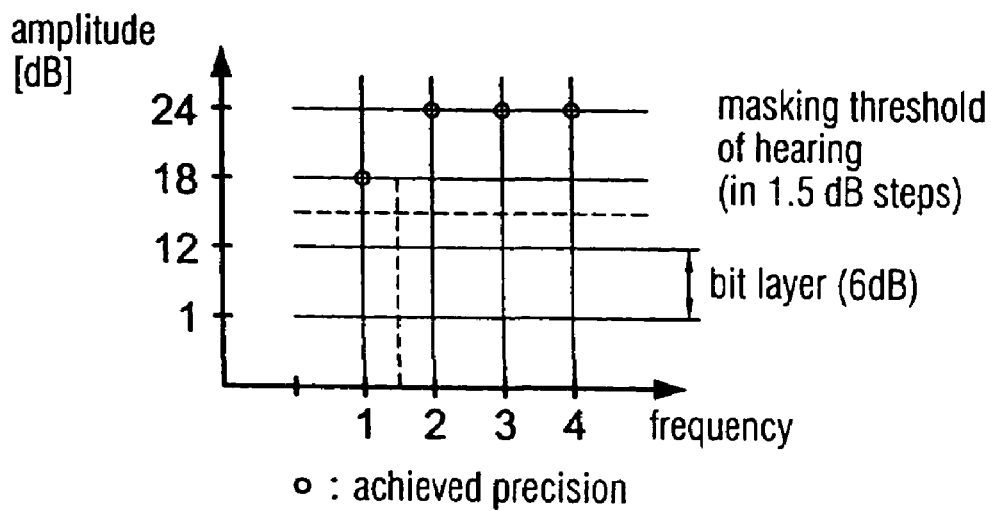
FIG. 5 shows a schematic representation for illustrating the selection of a spectral value for a sub-scaling layer in a band-wise representation of the masking threshold of hearing.

From FIGS. 4 and 5 detailed reference is made to the best modes of selecting which of the m spectral lines in the next sub-layer will be refined.

FIG. 4 shows a case, which the masking threshold of hearing is represented on a line-wise basis. The masking threshold of hearing is plotted as a continuous line. The MSB of the masking threshold of hearing is plotted above in the form of a "cross". The decoding of all scaling layers lying above, which are not represented in FIG. 4, has already been completed such that the spectral values 1, 2, 3, and 4, are present with a precision represented by "0". The previously transmitted bit represented by "0" therefore represents the precision of the spectral line in the decoder. By comparing the value of the previously processed spectral value in the encoder to the value of the masking threshold of hearing for this spectral value, it becomes immediately apparent which spectral value has previously been transmitted in the least imprecise manner. In the example shown in FIG. 4, as may easily be seen from FIG. 4, this includes the spectral value 2. The first sub-scaling layer will therefore obtain the next bit of the spectral value No. 2.

The next spectral value for the second sub-scaling layer is the spectral value No. 4. Then the spectral value No. 1. for the third sub-scaling layer should follow and finally the spectral value No. 3 for the fourth sub-scaling layer.

The next bit to be coded will therefore be determined from the frequency line with the greatest difference between the precision of the previously processed spectral value and the masking threshold of hearing.

It should be appreciated that this process in the decoder may be inverted such that the decoder is able to find out, without any additional side information, which spectral value will be further refined by the sub-scaling layer to be decoded next, as long as the decoder knows the continuous course of the psycho-acoustic masking threshold.

FIG. 5 shows the case of the band-wise representation of the masking threshold of hearing. From FIG. 5 it may be seen that the bits of the spectral values 2, 3, and 4 may be considered as sub-scaling layers to be processed next, since as compared to the masking threshold of hearing, they are spaced from the same by the greatest distance. In contrast to that, the value of the spectral value 1 is already positioned close to the masking threshold of hearing, so that the spectral value 1 does not necessarily have to be refined, but the spectral values 2, 3, and 4 have to.

In principle, each of the spectral values 2, 3, 4 could be considered in the next sub-scaling layer. However, noise shaping may be achieved in that the absolute value of the spectral values 2, 3, and 4, as have already been processed in the encoder and/or in the decoder, is considered. For example, if it turns out that, for example, six higher-order bits have already been transmitted for spectral value No. 2, indicating that spectral value No. 2 is very large, this means, in relative terms, that this spectral value is already represented in a fairly precise manner. If, in contrast, it is found out that spectral value No. 3 is a smaller spectral value in that only, for example, one single higher-order bit has been transmitted, first the spectral value with No. 3, as it is preferred in accordance with the invention, will be processed in a sub-scaling layer and then spectral value No. 2. This recognition is based on the fact, that it is assumed that the relative precision for the hearing impression is more significant than the absolute precision.

Figure 8:
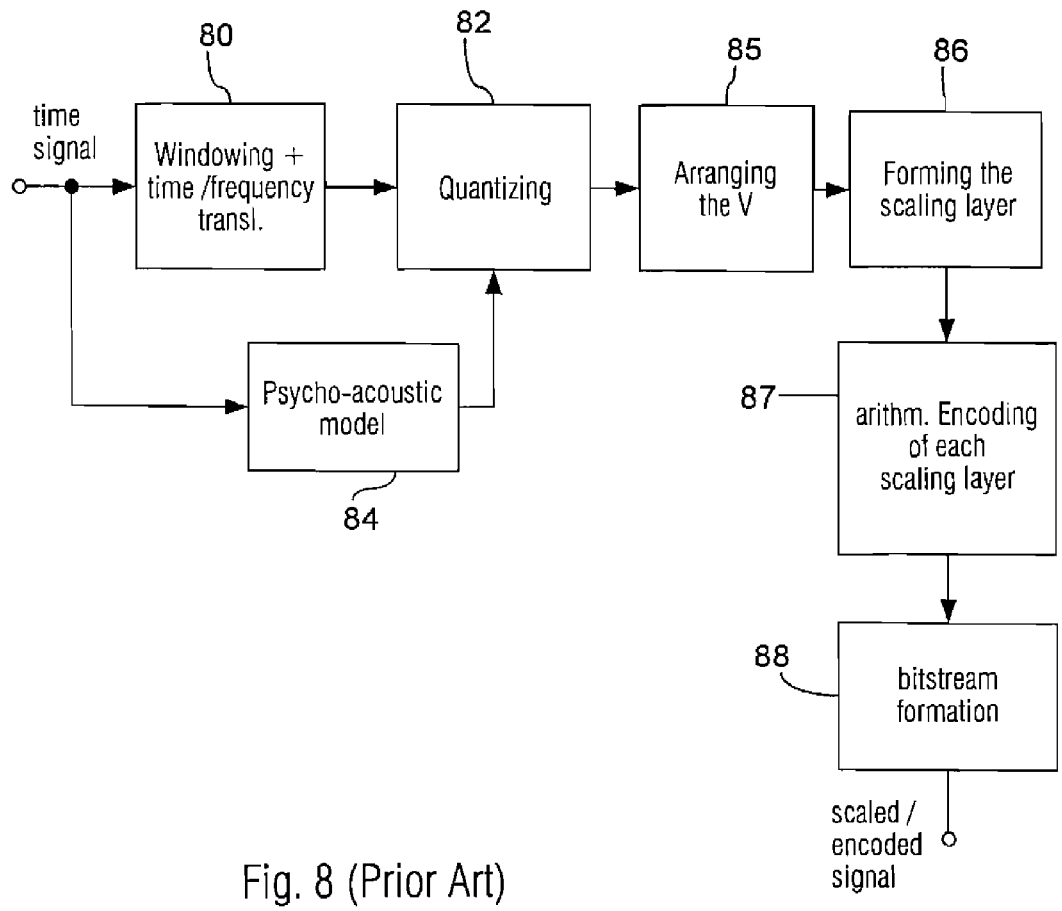
FIG. 8 shows a block diagram of a prior art BSAC-encoder.
Figure 9:
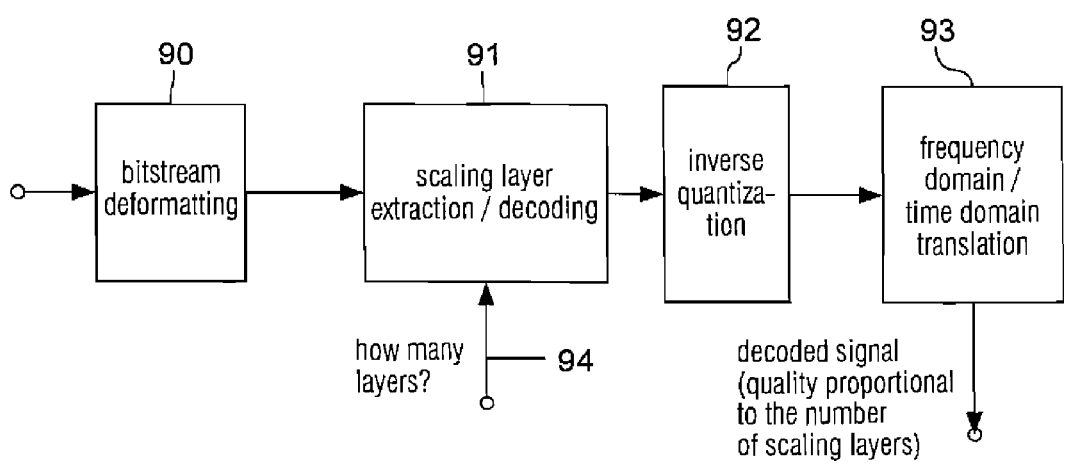
FIG. 9 shows a block diagram of a prior art BSAC decoder.

FIG. 6 shows a total block diagram of an inventive encoder. The time signal will be fed to an input 600 in the encoder and, for example, by the means of an IntMDCT 602 translated into the frequency domain. Parallel to this, the psycho-acoustic model 84 is in operation, which may principally comprise the same structure as the psycho-acoustic model 84, which is represented in FIG. 8. The masking threshold, which is calculated by the psycho-acoustic model 84, will now, as in FIG. 8, not be used for quantizing, but for defining 604 of scaling layers. In particular, in a preferred embodiment of the present invention, the means 84 provides the MSB of the masking threshold either on a per-spectral-value or a per-band-basis, in order to so to say determine the bold-edged boxes represented in FIG. 3. The means 604 then defines the scaling layers relative to the order of the MSBs of the masking threshold (of the bold box in FIG. 3).

The means 604 for defining scaling layers controls the means 102 from FIG. 1a for generating sub-scaling layers and/or for generating scaling-layers, if both scaling layers and sub-scaling layers are to be employed. In the embodiment shown in FIG. 3, the means 102 would operate such that it would generate three complete sub-scaling layers and feed the same to a means 606 for arithmetically encoding, and then, for the fourth layer concerning the bits of the spectral values, the order of which equals to the order of the MSBs of the masking threshold, would subdivide them into a certain number of sub-scaling layers. After the arithmetical encoding of the sub-scaling layers, the scaling layers and the sub-scaling layers will be generated in a bit stream by a bit stream formation means 608 so as to obtain a scaled/encoded signal, which may principally comprise the structure shown in FIG. 1*b*.

The scaled/encoded signal will be fed into an input 700 of a decoder shown in FIG. 7, with a means 702 deformatting the bit stream shown in FIG. 1*b* so as to separate the side information from the sub-scaling layers, etc. An extraction/encoding means 704 will then successively conduct an arithmetical encoding of the scaling layers and the sub-scaling layers, such that, in a memory not shown in FIG. 7, which is located on the decoder side, the bit patterns of the individual spectral values can build up one after the other.

Depending on the number of the transmitted scaling layers and/or depending on the control signal at a control input in the means 704, the decoder will sometime cease to decode further scaling layers or sub-scaling layers. If all scaling layers and sub-scaling layers generated on the encoder-side have been transmitted and decoded in the bit stream, a lossless encoding/transmission/decoding will have taken place, and the decoder does not have to conduct any interpretation of quantized values. The obtained spectral values subsequent to a lossless or almost lossless encoding/transmission/decoding will be fed to an backward transformation means 706, which, for example, carries out an inverse IntMDCT (IntMDCT$^{-1}$), so as to obtain a decoded signal at an output 708. If, for example, scaling layers or sub-scaling layers determined on the basis of the transmission channel were cut off or if the decoder, due to its structure, was not able to process all scaling layers or sub-scaling layers, or if the means 704 was controlled so as to process only a certain number of scaling layers and/or sub-scaling layers, the inventive decoder will carry out an interpretation of the previously available spectral value bit pattern. If not all bit layers of the spectrum are transmitted, only the higher-order bits will be available for each spectral value in the decoder.

Being aware of the masking threshold of hearing and the number of bit layers generated in total in the decoder for the lossless case and/or which may be generated in total, the decoder now determines how many bit layers—and thus how many bits—have not been transmitted for each individual spectral value. From these data, the decoder constructs a quantized spectral value. The easiest approach for this consists in that the non-transmitted bits are replaced by zeroes. In this case, the quantizing process will always result in a rounding towards smaller absolute values.

In accordance with the invention, it is preferred to keep the mean quantizing error as small as possible. This is achieved by using a so-called "Uniform Midrise Quantizer", as is described in N. S. Jayant and P. Noll: "Digital coding of waveforms", Prentice-Hall, 1984. This quantizer leaves the quantizing interval used in quantizing unchanged, but shifts the quantized value, that is the representative of the quantizing interval and thus the interpretation of the transmitted bits by a certain value. A shift towards the centre of the quantizing interval is achieved, for example, by using the bit pattern "1 0 0 0 . . . " for the missing bits. For the missing low-order bits of a spectral value it is generally preferred to use bit patterns in the quantizer for reconstruction, which distinguish themselves from the "rounding bit pattern", which is represented by "0 0 0 . . . ". In other words, this means that the reconstruction bit pattern includes at least one "1", and preferably that the most significant bit of the reconstruction bit pattern is a "1".

In the following, detailed reference is made to the functionality of the encoder shown in FIG. 6 and the decoder shown in FIG. 7, which, as a preferred transform algorithm, include the IntMDCT. The IntMDCT-spectrum provides a spectral integer representation of the audio signal. Parallel to this, the psycho-acoustic model in the encoder shown in FIG. 6 calculates the masking threshold of hearing. The masking threshold of hearing, as has been set forth, can be efficiently encoded due to the continuous course and may be transmitted in the bit stream, for example, by coefficients of an FIR filter or by a polynomial interpolation.

For each spectral line the number of bits, which are not significant in terms of psycho-acoustics, that is, the bits of the spectral values, the order of which is less than the order of the MSB of the masking threshold of hearing for this spectral value, will result from the masking threshold of hearing. Relating to FIG. 3, these are the bits below the bold-edged boxes.

Each magnitude value of the integer spectral values is represented on a bit-wise basis, so as to define, by means of means 604, bit layers of an identical psycho-acoustic significance along the frequency domain, for example, in parallel to the layer of the still psycho-acoustically significant bits, with a preference of low-order frequencies in the more significant layers being preferred. The bits will be ordered along the significance layers, starting with the most significant bit. The start layer either results from the theoretical maximum values or from an efficiently encoded spectral envelope, analogue to the encoded masking threshold of hearing, or from a parallel displacement of the masking threshold of hearing, such as, for example, by 30 db, which would correspond to 5 bits.

An occurrence of a "1" in the layers of a high significance is very unlikely, since only few spectral lines protrude far from the masking threshold of hearing, such as, for example, spectral line 5 from FIG. 2 or FIG. 3. Towards the lower layers, the probability of meeting a "1" increases and approximates 50%. Upon a bit sequence arranged in this way, it is preferred to apply a bit-wise arithmetical encoding for redundancy reduction.

In an aspect of the present invention, the scalability area, as in MPEG-4 BSAC, is not only extended as far as the psycho-acoustic transparency, but as far as lossless encoding/decoding. If the total encoded bit sequence and, with a corresponding representation, also the pertaining signs of the spectral values are transmitted, the embodiment will operate on a lossless basis. With only a part of the encoded bit sequence transmitted, this will already result in an irrelevance reduction. If the encoded bit sequence is transmitted as far as the layer of the only just significant bits, the method operates only just in the transparent mode. If less bits are transmitted, a reduction of the bit rate will result, which also results in a reduction of the audio/video quality.

If, in addition to these psycho-acoustic significant layers, further layers are transmitted, the audio signal (video signal) will be represented with an additional safety distance to the masking threshold and thus enables an almost lossless representation with a great robustness as against post-processing steps.

The number of the needed bits for achieving a transparency varies from block to block. If this information is encoded in the complete lossless bit stream, this information may be used for controlling the bit allocations for achieving a constant bit rate. This information is exactly available and may be used for any desired constant bit rate. Thus, from the complete lossless encoded bit stream, an acoustically adapted encoded sub-bit stream may be taken for each specified constant bit rate, the former using the functionality of the locally varying bit rate.

Finally, the transmission of the bit layers in the side information, which are required for achieving a transparency, enables a control of the current audio quality transmitted in the sub-bit stream by comparing this value with the number of the actually transmitted bit layers.

As an example for an integer transform algorithm, the following refers to the IntMDCT transform algorithm, which is described in "Audio Coding Based on Integer Transforms" 111th AES convention, New York, 2001. The IntMDCT is especially favourable, since it provides the most attractive properties of the MDCT, such as, for example, good spectral representation of the audio signal, critical sampling, and block overlapping.

Figure 10A:
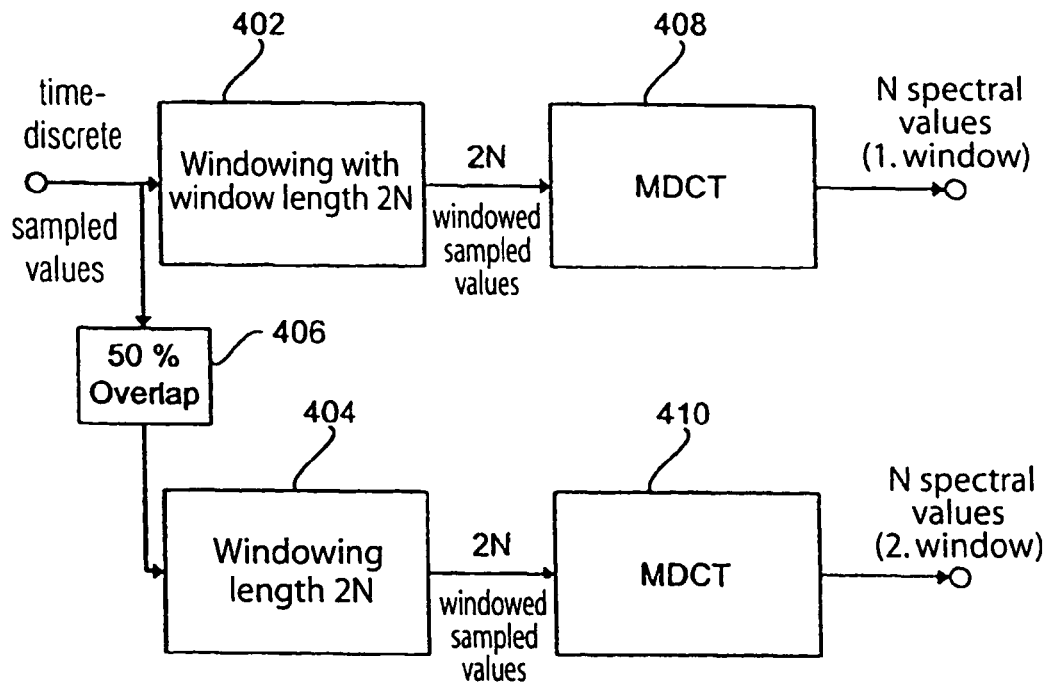
FIG. 10a shows a schematic block diagram of a prior art encoder with MDCT and 50% overlapping.
Figure 10B:
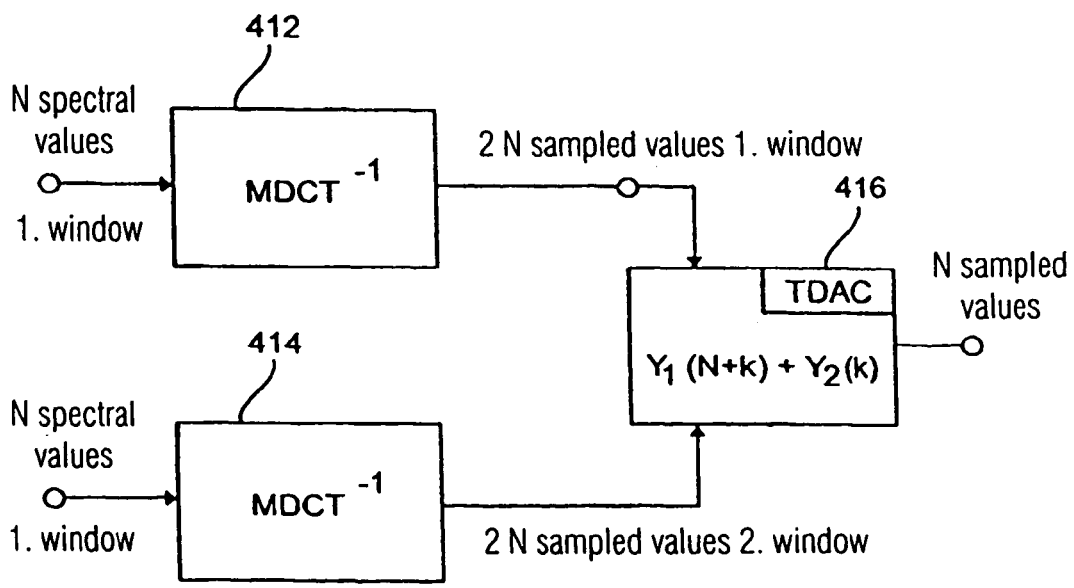
Figure 11:
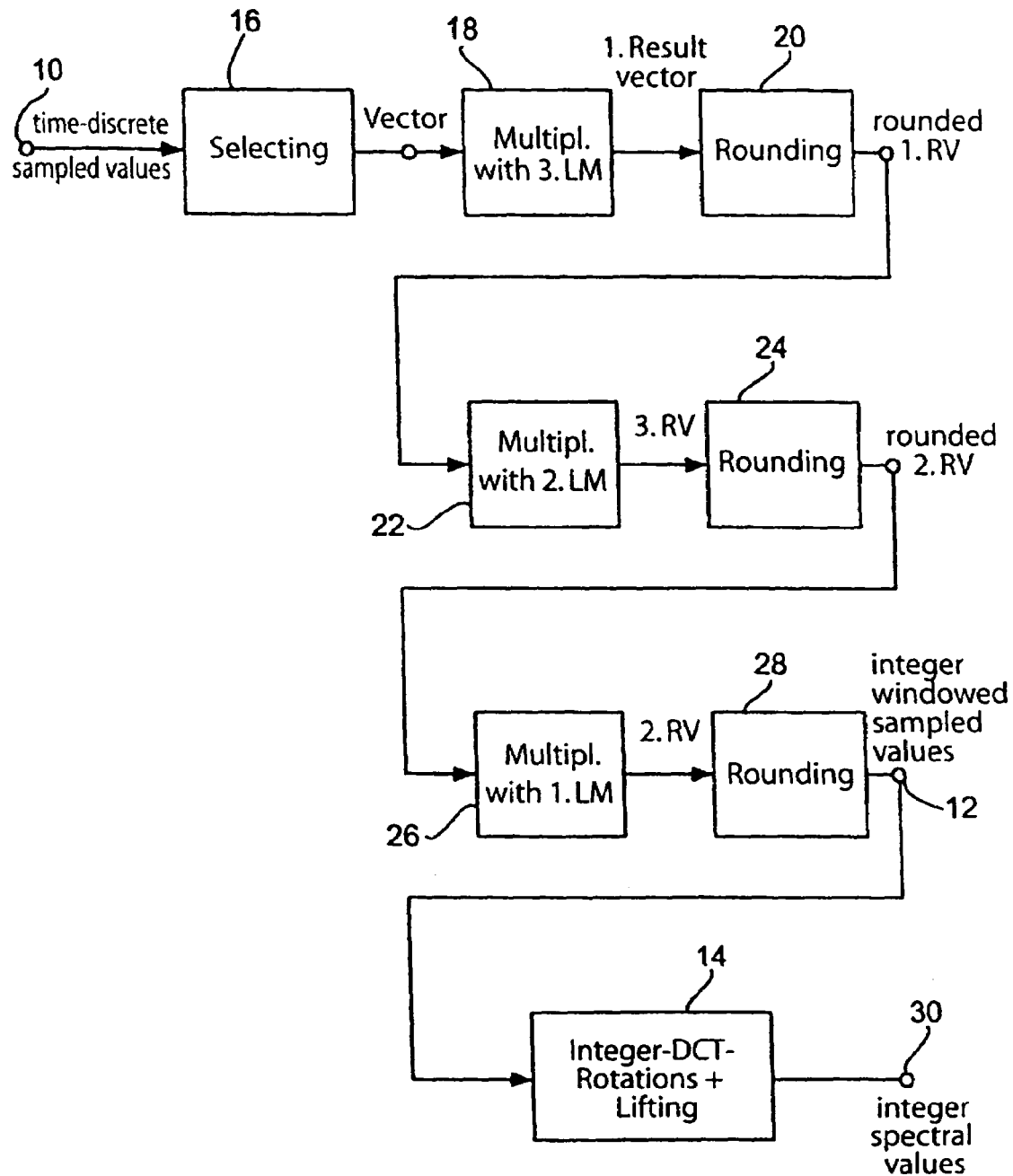
FIG. 11 shows a block diagram of a preferred means for processing time discrete audio sampled values so as to obtain integer values, from which integer spectral values may be averaged out.

FIG. 11 shows an overview diagram for the inventive preferred apparatus for processing time-discrete sampled values representing an audio signal so as to obtain integer values, relying on which the IntMDCT integer transform algorithm operates. The time-discrete sampled values will then be windowed by the apparatus shown in FIG. 11 and optionally translated into a spectral representation. The time-discrete sampled values being fed into the apparatus at an input 10 will be windowed with a window w having a length corresponding to 2 N time-discrete sampled values so as to achieve integer windowed sampled values at an output 12, which are suitable to be translated into a spectral representation by means of a transform and especially the means for means 14 for carrying out an integer DCT. The integer DCT is implemented to generate N output values from N input values, which is in contrast to the MDCT function 408 from FIG. 10a, which only generates N spectral values from 2N windowed sampled values on the basis of the MDCT equation.

For windowing the time-discrete sampled values two time-discrete sampled values are at first selected in a means 16, which together represent a vector of time-discrete sampled values. A time-discrete sampled value, which is selected by the means 16, is positioned in the first quarter of the window. The other time-discrete sampled value is positioned in the second quarter of the window, as is set forth in more detail from FIG. 13. The vector generated by means 16 is now provided with a rotary matrix of the dimension 2×2, with the operation not being carried out immediately but by means of several so-called lifting matrices.

A lifting matrix has the property that it only comprises one element which depends on the window w and is unequal to "1" or "0".

The factorization of wavelet transform in lifting steps is represented in the technical publication "Factoring Wavelet Transforms Into Lifting Steps", Ingrid Daubechies and Wim Sweldens, Preprint, Bell Laboratories, Lucent Technologies, 1996. Generally, a lifting scheme is a simple relation between perfectly reconstructing filter pairs which comprise the same low-pass or high-pass filter. Each pair of complementary filters may be factorized in lifting steps. In particular, this applies to the Givens rotations. Consider the case in which the poly-phase matrix is a Givens rotation. Then, the following equation is valid:

$$\begin{pmatrix} \cos\alpha & -\sin\alpha \\ \sin\alpha & \cos\alpha \end{pmatrix} = \begin{pmatrix} 1 & \frac{\cos\alpha - 1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha - 1}{\sin\alpha} \\ 0 & 1 \end{pmatrix} \quad (1)$$

Each of the three lifting matrices to the right of the equalization sign have the value "1" as main diagonal elements. Further, in each lifting matrix, a subsidiary diagonal element equals 0, and a subsidiary diagonal element is dependent on the rotary angle α.

The vector will now be multiplied with the third lifting matrix, i.e. the lifting matrix to the very right in the above equation so as to obtain a first result vector. This is represented by a means 18 in FIG. 11. In accordance with the invention, the first result vector will now be rounded with any rounding function mapping the amount of the real numbers in the amount of the integer numbers, as is represented in FIG. 11 by a means 20. At the output of the means 20 a rounded first result vector is obtained. The rounded first result vector is now fed into a means 22 for multiplying the same by the middle, i.e. second, lifting matrix so as to obtain a second result vector which is again rounded in a means 24 so as to obtain a rounded second result vector. The rounded second result vector is now fed into a means 26, i.e. for multiplying the same by the lifting matrix set forth on the left side in the above equation, i.e. by the first lifting matrix, so as to obtain a third result vector, which is finally rounded once more by means of a means 28 so as to finally obtain integer window sampled values at the output 12, which now have to be processed by the means 14, if a spectral representation of the same is desired so as to obtain integer spectral values at a spectral output 30.

Preferably the means 14 is implemented as an integer DCT or integer DCT.

The discrete cosine transform in accordance with type 4 (DCT-IV) having a length N is given by the following equation:

$$X_t(m) = \sqrt{\frac{2}{N}} \sum_{k=0}^{N-1} x(k) \cos\left(\frac{\pi}{4N}(2k+1)(2m+1)\right) \quad (2)$$

The coefficients of the DCT-IV form an orthonormal N×N matrix. Each orthogonal N×N matrix may be decomposed in N (N−1)/2 Givens rotation, as is set forth in the technical publication P. P. Vaidyanathan, "Multirate Systems And Filter Banks", Prentice Hall, Englewood Cliffs, 1993. It should be appreciated that further decompositions also exist.

With respect to the classifications of the various DCT algorithms, reference should be made to H. S. Malvar, "Signal Processing With Lapped Transforms", Artech House, 1992. Generally, the DCT algorithms distinguish themselves by the type of their basis function. While the DCT-IV, which is preferred in the present invention, includes non-symmetric basis functions, i.e. a cosine quarter wave, a cosine 3/4 wave, a cosine 5/4 wave, a cosine 7/4 wave, etc., the discrete cosine transform, for example, of the type II (DCT-II), has axis symmetric and point symmetric basis functions. The 0th basis function has a direct component, the first basis function is a half cosine wave, the second basis function is a whole cosine wave, and so on. Owing to the fact that DCT-II especially considers the direct component, the same is used in video-encoding, but not in audio-encoding, since, in audio-encoding, in contrast to video-encoding, the direct component is not relevant.

In the following special reference is made to as how the rotary angle α of the Givens rotation depends on the window function.

An MDCT with a window length of 2 N may be reduced into a discrete cosine transform of type IV with a length N. This is achieved by explicitly carrying out the TDAC transform in the time domain and then applying the DCT-IV. In a 50% overlapping the left half of the window for a block t overlaps the right half of the preceding block, i.e. the block t−1. The overlapping part of two successive blocks t−1 and t will be preprocessed in a time domain, i.e. prior to the transform, as follows, i.e. is processed between the input 10 and the output 12 from FIG. 11:

$$\begin{pmatrix} \tilde{x}_t(k) \\ \tilde{x}_{t-1}(N-1-k) \end{pmatrix} = \qquad (3)$$

$$\begin{pmatrix} w\left(\frac{N}{2}+k\right) & -w\left(\frac{N}{2}-1-k\right) \\ w\left(\frac{N}{2}-1-k\right) & w\left(\frac{N}{2}+k\right) \end{pmatrix} \begin{pmatrix} x_t\left(\frac{N}{2}+k\right) \\ x_t\left(\frac{N}{2}-1-k\right) \end{pmatrix}$$

The values designated with a tilde comprise those values at the output 12 from FIG. 1, while the x values designated in the above equation without any tilde comprise those values at the input 10 and/or behind the means 16 which are to be selected. The running index k runs from 0 to N/2−1, while w represents the window function.

From the TDAC condition for the window function w, the following context is valid:

$$w\left(\frac{N}{2}+k\right)^2 + w\left(\frac{N}{2}-1-k\right)^2 = 1 \qquad (4)$$

For certain angles $\alpha_k$, k=0, ..., N/2−1, this preprocessing in the time domain may be written as a Givens rotation, as has been set forth.

The angle α of the Givens rotation depends on the window function was follows:

$$\alpha = \arctan[w(N/2-1-k)/w(N/2+k)] \qquad (5)$$

It should be appreciated that any window functions w may be employed as long as this TDAC condition is fulfilled.

In the following a cascaded encoder and decoder are described by means of FIG. 12. The time-discrete sampled values x(0) to x (2N−1), which are windowed together by one window, will be selected such by the means 16 from FIG. 11 that the sampled value x(0) and the sampled value x(N−1), i.e. a sampled value from the first quarter of the window and a sampled value from the second quarter of the window, are selected so as to form the vector at the output of the means 16. The intersecting arrows schematically represent the lifting multiplications and subsequent roundings of the means 18, 20 and/or 22, 24 and/or 26, 28 so as to obtain the integer window sampled values at the input of the DCT-IV blocks.

When the first vector, as described above, has been processed, a second vector is further selected from the sampled values x(N/2−1) and x(N/2), i.e. again a sampled value from the first quarter of the window and a sampled value from the second quarter of the window, and processed by the algorithm described in FIG. 1. As an analogy to this all the other sampled value pairs from the first and second quarter of the window will be processed. The same processing will be carried out for the third and fourth quarter of the first window. 2N windowed integer sampled values are now present at the output 12, which will now be fed, as is represented in FIG. 12, into a DCT-IV transform. In particular, the integer windowed sampled values of the second and third quarter will be fed into a DCT. The windowed integer sampled values of the first quarter of a window will be processed in a preceding DCT-IV together with the windowed integer sampled values of the fourth quarter of the preceding window. As an analogy to this the fourth quarter of the windowed integer sampled values in FIG. 12 together with the first quarter of the next window will be fed together in a DCT-IV transform. The middle integer DCT-IV transform 32 shown in FIG. 12 now provides N integer spectral values y(0) to y(N−1). These integer spectral values may now be simply subjected to an entropy-encoding without any intermediate quantizing being required, since the inventive windowing and transform provide integer output values.

Figure 12:
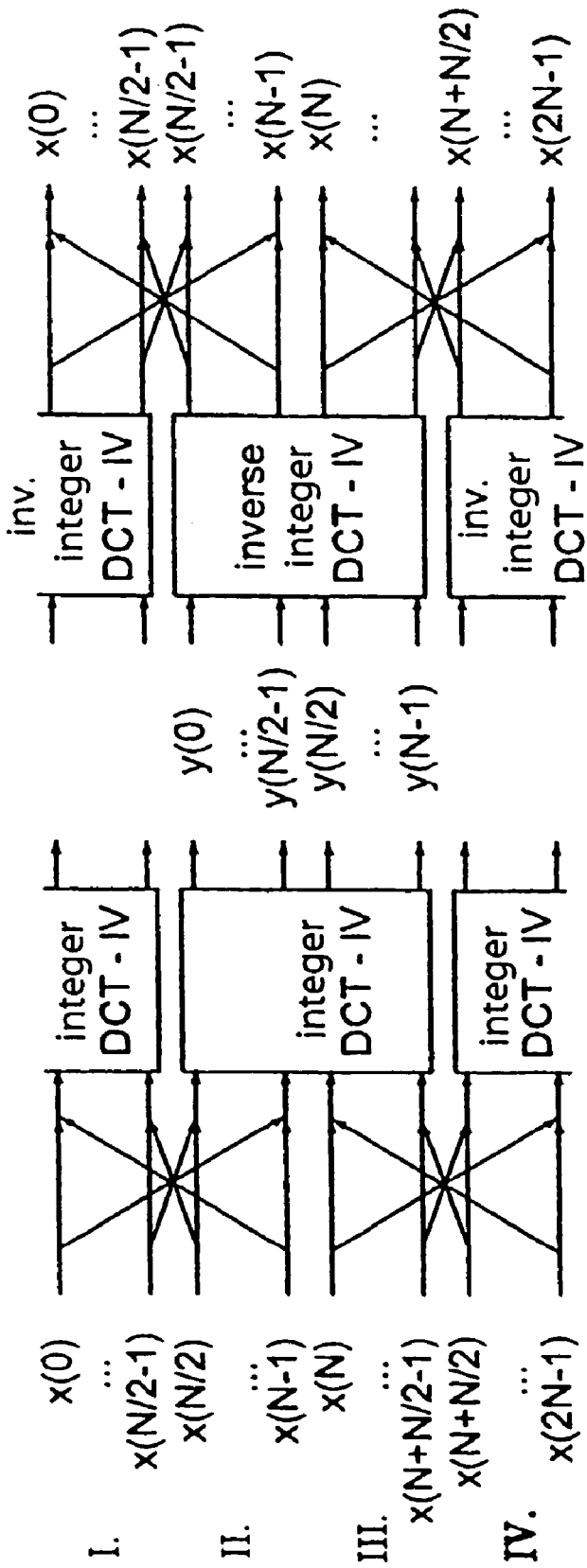
FIG. 12 shows a schematic representation of the decomposition of an MDCT and an inverse MDCT in Givens rotations and two DCT-IV-operations.

A decoder is shown in the right half of FIG. 12. The decoder consisting of retransform and inverse windowing works inversely to the encoder. It is known that for inverse transform of a DCT-IV an inverse DCT-IV may be used, as is shown in FIG. 12. The output values of the decoder DCT-IV 34, as is shown in FIG. 2, will now be inversely processed with the corresponding values of the preceding transform and/or the subsequent transform in accordance with the present invention so as to generate, from the integer windowed samples values at the output of the means 34 and/or of the preceding and subsequent transform, time-discrete audio sampled values x(0) to x(2N−1).

The output-side operation inventively takes place by an inverse Givens rotation, i.e. such that the blocks 26, 28 and/or 22, 24 and/or 18, 20 are being passed through in the opposite direction. This should be represented in more detail by means of the second lifting matrix from equation 1. If (in the encoder) the second result vector is formed by multiplication of the rounded first result vector by the second lifting matrix (means 22), the following expression results:

$$(x,y) \rightarrow (x, y+x \sin \alpha) \qquad (6)$$

The values x, y on the right side of the equation 6 are integers. This, however, does not apply to the value sin α. Here, the rounding function r has to be introduced as is the case in the following equation:

$$(x,y) \rightarrow (x, y+r(x \sin \alpha)) \qquad (7)$$

Means 24 carries out this operation.

The inverse mapping (in the decoder) is defined as follows:

$$(x',y') \rightarrow (x', y'-r(x \sin \alpha)) \qquad (8)$$

From the minus sign in front of the rounding operation it is obvious that the integer approximation of the lifting step may be reversed without any error being introduced. Applying this approximation on each of the three lifting steps results in an integer approximation of the Givens rotation. The rounded rotation (in the encoder) may be inverted (in a decoder), without introducing an error, namely by passing through the inverse rounded lifting steps in an inverted order, i.e. if the algorithm from FIG. 1 is carried out from the bottom to the top during decoding.

If the rounding function r is point-symmetric, the inverse rounded rotation is identical with the rounded rotation with the angle −α and is as follows:

$$\begin{pmatrix} \cos\alpha & \sin\alpha \\ -\sin\alpha & \cos\alpha \end{pmatrix} \quad (9)$$

The lifting matrices for the decoder, i.e. for the inverse Givens rotation, immediately result in this case from equation (1) by merely replacing the expression "sin α" by the expression "−sin α".

Figure 13:
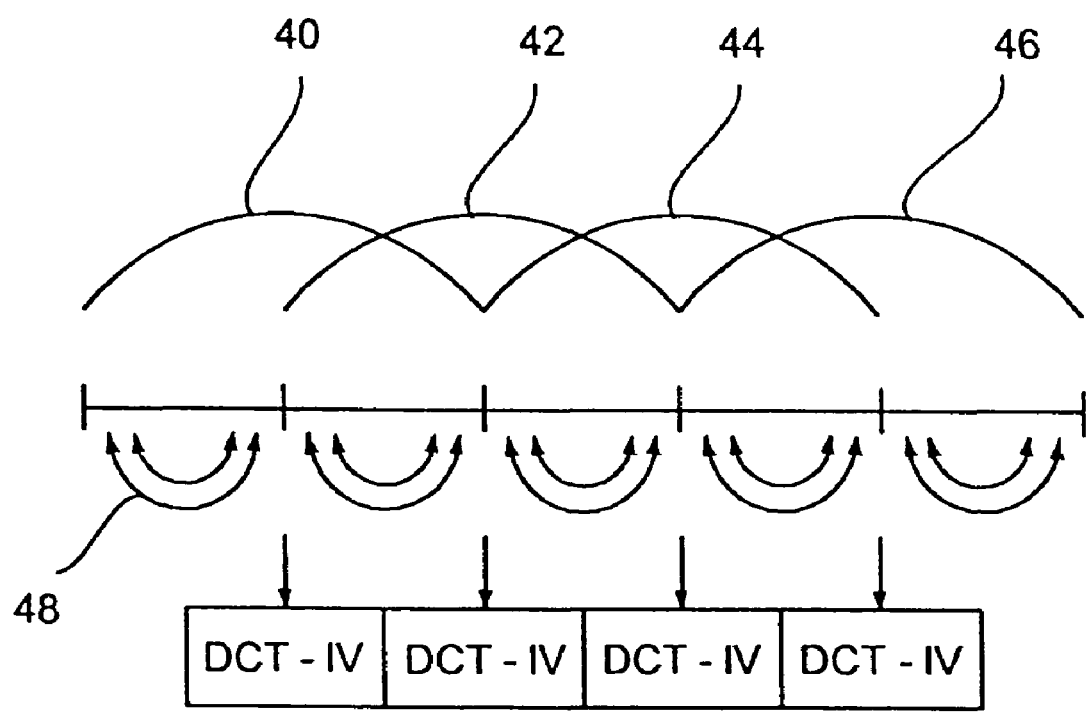
FIG. 13 shows a representation for illustrating the decomposition of the MDCT with a 50% overlapping in rotations and DCT-IV-operations.

In the following the decomposition of a common MDCT with overlapping windows 42 to 46 is once more shown by means of FIG. 13. The windows 40 to 46 each have an overlapping of 50%. Per window, Givens rotations are at first carried out within the first and the second quarter of a window and/or within the third and fourth quarter of a window, as is schematically represented by the arrows 48. Then, the rotating value, i.e. the windowed integer sampled values, will be fed into an N-to-N-DCT such that the second and the third quarter of a window and/or the fourth and the first quarter of a subsequent window will always be implemented together by means of a DCT-IV algorithm in a spectral representation.

In accordance with the invention the usual Givens rotations are decomposed in lifting matrices, which are sequentially carried out, wherein, after each lifting matrix multiplication, a rounding step is carried out such that the floating-point numbers will be rounded immediately after their arising such that, prior to each multiplication of a result vector with a lifting matrix, the result vector only comprises integers.

Thus, the output values always remain integer, wherein it is preferred to use integer input values. This does not represent any constriction, since any PCM sampled values, as are stored in a CD, are integer number values, the value area of which varies depending on the bit-width, i.e. depending on whether the time-discrete digital input values are 16 bit values or 24 bit values. Yet, as has been set forth, the whole process is invertible by carrying out the inverse rotations in an inverse order. In accordance with the invention, an integer approximation of the MDCT exists for the perfect reconstruction, that is a lossless transform.

The inventive transform provides integer output values instead of floating point values. It provides a perfect reconstruction such that no errors will be introduced if a forward and then a backward transform are carried out. In accordance with a preferred embodiment of the present invention the transform is a replacement for the modified discrete cosine transform. Other transform methods may also be carried out on an integer basis as long as a decomposition in rotations and a decomposition of the rotations in lifting steps is possible.

The integer MDCT in accordance with the present invention provides the most favorable properties of the MDCT. It has an overlapping structure, as a result of which a better frequency selectivity than with non-overlapping block transforms may be obtained. On the basis of the TDAC function which has already been considered when windowing prior to the transform, a critical sampling is maintained such that the total number of spectral values representing an audio signal equals the total number of input sampled values.

Compared to another normal MDCT providing the floating point sampled values the inventive integer transform discloses that, as compared to the normal MDCT, the noise is increased only in the spectral area, where there is little signal level, while this noise increase may not be noticed in significant signal levels. For this purpose, the inventive integer processing is suitable for an efficient hardware implementation, since only multiplication steps are used which may easily be decomposed into shift/add steps, which may be easily and quickly implemented on a hardware basis.

The inventive integer transform provides a good spectral representation of the audio signal and yet remains in the area of the integer numbers. If applied to tonal parts of an audio signal, this results in a good energy concentration. Thus, an efficient lossless encoding scheme may be built up by simply cascading the inventive windowing/transform represented in FIG. 1 with an entropy-encoder. Especially, a stacked encoding using escape values, as it is used in MPEG AAC, is favorable for the present invention. It is preferred to scale down all values by a certain power until they fit in a desired code table, and then to additionally encode the left out least significant bits. As compared to the alternative of the using greater code tables, the described alternative is more inexpensive with respect to the storage consumption for storing the code table. A nearly lossless encoder might also be obtained by simply leaving out certain ones of the least significant bits.

In particular for tonal signals an entropy-encoding of the integer spectral values enables a high encoding gain. For transient parts of the signal, the encoding gain is low, namely on the basis of the flat spectrum of the transient signal, i.e. on the basis of a low number of spectral values, which are equal to or almost 0. As is described in J. Herre, J. D. Johnston: "Enhancing the Performance of Perceptual Audio Coders by Using Temporal Noise Shaping (TNS)" 101, AES Convention, Los Angeles, 1996, Preprint 4384, this flatness, however, may be used by using a linear prediction in the frequency domain. An alternative is a prediction with an open loop. Another alternative is the predictor with a closed loop. The first alternative, i.e. the predictor with an open loop, is referred to as a TNS. The quantizing of the prediction results in an adaptation of the resulting quantizing noise to the time structure of the audio signal and prevents pre-echos in psycho-acoustic audio-encoding. For a lossless audio-encoding, the second alternative, i.e. with a predictor with a closed loop, is more suitable, since the prediction with a closed loop allows an accurate reconstruction of the input signal. If this technology is applied to an inventively generated spectrum, a rounding step has to be carried out after each step of the prediction filter so as to remain in the range of the integers. By using the inverse filter and the same rounding function, the original spectrum may be accurately reproduced.

In order to utilize the redundancy between two channels for data reduction, a middle-side encoding may be employed on a lossless basis, if a rounded rotation having an angle π/4 is used. As compared to the alternative of calculating the sum and difference of the left and right channel of a stereo signal, the rounded rotation provides the advantage of energy conservation. Using so-called joint-stereo encoding techniques may be turned on or off for each band, as is carried out in the standard MPEG AAC. Further rotary angles may also be considered so as to be able to reduce a redundancy between two channels in more flexible manner.

Depending on practical circumstances, the inventive encoder concept and/or the inventive decoder concept may be implemented in a hardware or in a software. The implementation will be effected on a digital storage medium, in particular, on a floppy disk or a CD with electronically readable control signals, which may cooperate with a programmable computer system so that the corresponding method is carried out. Generally the invention consists also in a computer program product having a program code stored on a machine-readable carrier for carrying out the inventive encoding method or the inventive decoding method, if the computer program product executes on a computer. In other words, the invention thus represents a computer program with a program code for carrying out the method for decoding and/or for carrying out the method for encoding, if the computer program executes on a computer.

The below-described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An apparatus for scalable encoding of a spectrum of a signal including audio and/or video information, with the spectrum comprising binary spectral values, the apparatus comprising:
a generator for generating a first sub-scaling layer using bits of a certain order of a first number of the binary spectral values in a band, with the first number being greater or equal to "1" and less than a total number of the binary spectral values in the band, and for generating a second sub-scaling layer using bits of the certain order of a second number of the binary spectral values, with the generator being implemented so as to select the second number of the binary spectral values, such that the number is greater than or equal to "1" and less than the total number of the binary spectral values in the band, and to further determine the second number of the spectral values, such that the number comprises at least one binary spectral value which is not contained in the first number of binary spectral values; and
a Means for forming an encoded signal, with the means for forming being implemented so as to include the first sub-scaling layer and the second sub-scaling layer into the encoded signal such, that the first and the second sub-scaling layer are separately decodable from each other.

2. The apparatus in accordance with claim 1, further comprising:
a full-scaling layer generator for generating a full-scaling layer using all bits with an order, which is different from the certain order, in the band, and
with the means for forming being further implemented, so as to include the full-scaling layer in the bit stream, such that it is independently decodeable from the first and the second sub-scaling layer.

3. The apparatus in accordance with claim 1, wherein the binary spectral values are quantized, with the apparatus further comprising:
a calculator for calculating orders of most significant bits of a psycho-acoustic masking threshold for the bands; and
means for defining scaling layers of the bits of the binary spectral values, with a scaling layer comprising bits of the binary spectral values, the orders of which are in a certain difference to the orders of the most significant bits of the psycho-acoustic masking threshold for the bands or the orders of which are equal to the orders of the most significant bits of the psycho-acoustic masking threshold for these bands.

4. The apparatus in accordance with claim 3, wherein the generator is implemented so as to use as bits of a certain order the bits of the binary spectral values, the difference of which to the order of the most significant bits of the psycho-acoustic masking threshold in the band is equal to "+1", "0" and/or "−1".

5. The apparatus in accordance with claim 3, wherein the calculator is implemented so as to determine for each spectral value in the band an order of a most significant bit or to determine an order of a most significant bit of the psycho-acoustic masking threshold for the entire band.

6. The apparatus in accordance claim 3, wherein the means for forming is further implemented so as to include information on the psycho-acoustic masking threshold as side information into the encoded signal.

7. The apparatus in accordance claim 1,
wherein the first sub-scaling layer is decodeable prior to the second sub-scaling layer, and
wherein the generator is implemented so as to select for the first number of the binary spectral values the spectral value(s), by which a maximum precision gain for the band may be achieved.

8. The apparatus in accordance with claim 1,
wherein the first sub-scaling layer is decodeable prior to the second sub-scaling layer, and
wherein the generator is implemented so as to use for the first sub-scaling layer the binary spectral value which, represented by the bits in higher scaling layers, comprises the greatest difference to a psycho-acoustic masking threshold for the spectral value in the band.

9. The apparatus in accordance with claim 1
wherein the generator is implemented so as to use for the first sub-scaling layer the binary spectral value which, represented by the bits in higher scaling layers, is the smallest quantized spectral value in the band.

10. The apparatus in accordance with claim 1,
wherein the spectral values have been generated by an integer MDCT from time-sampled values of the signal.

11. The apparatus in accordance with claim 1, wherein the spectral values have been quantized using a psycho-acoustic and/or psycho-optical model.

12. The apparatus in accordance with claim 11,
wherein the generator is implemented so as to use a constant certain order of bits in the bands.

13. The apparatus in accordance with claim 11,
wherein the certain order includes the least significant order of the bits of the quantized binary spectral values.

14. The apparatus in accordance with claim 1,
wherein a band comprises m spectral values,
with m is being greater than or equal to "2", and
wherein the generator is implemented so as to calculate the first and second number of sub-scaling layers, such that they are at a maximum equal to m and at a minimum equal to "1", wherein, in the case, in which m sub-scaling layers are present, each sub-scaling layer includes a bit of the certain order of exactly one spectral value, with one spectral value being present only in exactly one sub-scaling layer for the certain order.

15. The apparatus in accordance with claim 14, wherein m is equal to "4".

16. The apparatus in accordance with claim 1,
wherein the generator is implemented so as to carry out an arithmetical encoding of the first and/or second number of bits of the quantized spectral values of the certain order.

17. An apparatus for scalable decoding an encoded signal comprising a first and a second sub-scaling layer, with the first sub-scaling layer comprising bits of a certain order of a first number of binary spectral value in a band, with the second sub-scaling layer comprising bits of the certain order of a second number of binary spectral values in the band, and with the second number comprising at least one spectral value not contained in the first number, the apparatus comprising:
- an extractor for extracting the first sub-scaling layer from the encoded signal and the second sub-scaling layer from the encoded signal; and
- a processor for processing the first sub-scaling layer and the second sub-scaling layer so as to determine the bits of the certain order of the binary quantized spectral values in the band.

18. The apparatus in accordance with claim 17,
wherein the first number of the binary spectral values for the first sub-scaling layer is selected so as to achieve a maximum precision gain for a band,
wherein the extractor is implemented so as to extract the first sub-scaling layer prior to the second sub-scaling layer.

19. A method for scalable encoding a spectrum of a signal including audio and/or video information, with the spectrum comprising binary spectral values, the method comprising:
- generating a first sub-scaling layer using bits of a certain order of the first number of binary spectral values in a band, with the first number being greater than or equal to "1" and less than a total number of the binary spectral values in the band, and generating a second sub-scaling layer using bits of the certain order of a second number of binary spectral values, the step of generating comprising selecting a second number of the binary spectral values, such that the number is greater than or equal to "1" and less than the total number of the binary spectral values in the band, and determining the second number of the spectral values further such, that the number comprises at least one binary spectral value, which is not contained in the first number of binary spectral values; and
- forming an encoded signal the step of forming—including the first sub-scaling layer and the second sub-scaling layer into the encoded signal such, that the first and the second sub-scaling layers are separately decodeable from each other.

20. A method for scalable decoding an encoded signal comprising a first and a second sub-scaling layer, with the first sub-scaling layer comprising bits of a certain order of a first number of binary spectral values in a band, with the second sub-scaling layer comprising bits of the certain order of a second number of binary spectral values in the band, and wherein the second number comprising at least one spectral value not contained in the first number, the method comprising the following steps:
- extracting the first sub-scaling layer from the encoded signal and the second sub-scaling layer from the encoded signal; and
- processing the first sub-scaling layer and the second sub-scaling layer so as to determine the bits of the certain order of the binary quantized spectral values in the band.

21. A computer memory device having stored thereon a computer program having a program code for carrying out, when the program executes on a computer, a method of scalable encoding a spectrum of a signal including audio and/or video information, with the spectrum comprising binary spectral values, the method comprising:
- generating a first sub-scaling layer using bits of a certain order of the first number of binary spectral values in a band, with the first number being greater than or equal to "1" and less than a total number of the binary spectral values in the band, and generating a second sub-scaling layer using bits of the certain order of a second number of binary spectral values, the step of generating comprising selecting a second number of the binary spectral values, such that the number is greater than or equal to "1" and less than the total number of the binary spectral values in the band, and determining the second number of the spectral values further such, that the number comprises at least one binary spectral value, which is not contained in the first number of binary spectral values; and
- forming an encoded signal, the step of forming comprising including the first sub-scaling layer and the second sub-scaling layer into the encoded signal such that the first and the second sub-scaling layers are separately decodeable from each other.

22. A computer memory device having stored thereon a computer program having a program code for carrying out, when the program executes on a computer, a method of scalable decoding an encoded signal comprising a first and a second sub-scaling layer, with the first sub-scaling layer comprising bits of a certain order of a first number of binary spectral values in a band, with the second sub-scaling layer comprising bits of the certain order of a second number of binary spectral values in the band, and wherein the second number comprising at least one spectral value not contained in the first number, the method comprising:
- extracting the first sub-scaling layer from the encoded signal and the second sub-scaling layer from the encoded signal; and
- processing the first sub-scaling layer and the second sub-scaling layer so as to determine the bits of the certain order of the binary quantized spectral values in the band.

* * * * *